April 22, 1924.

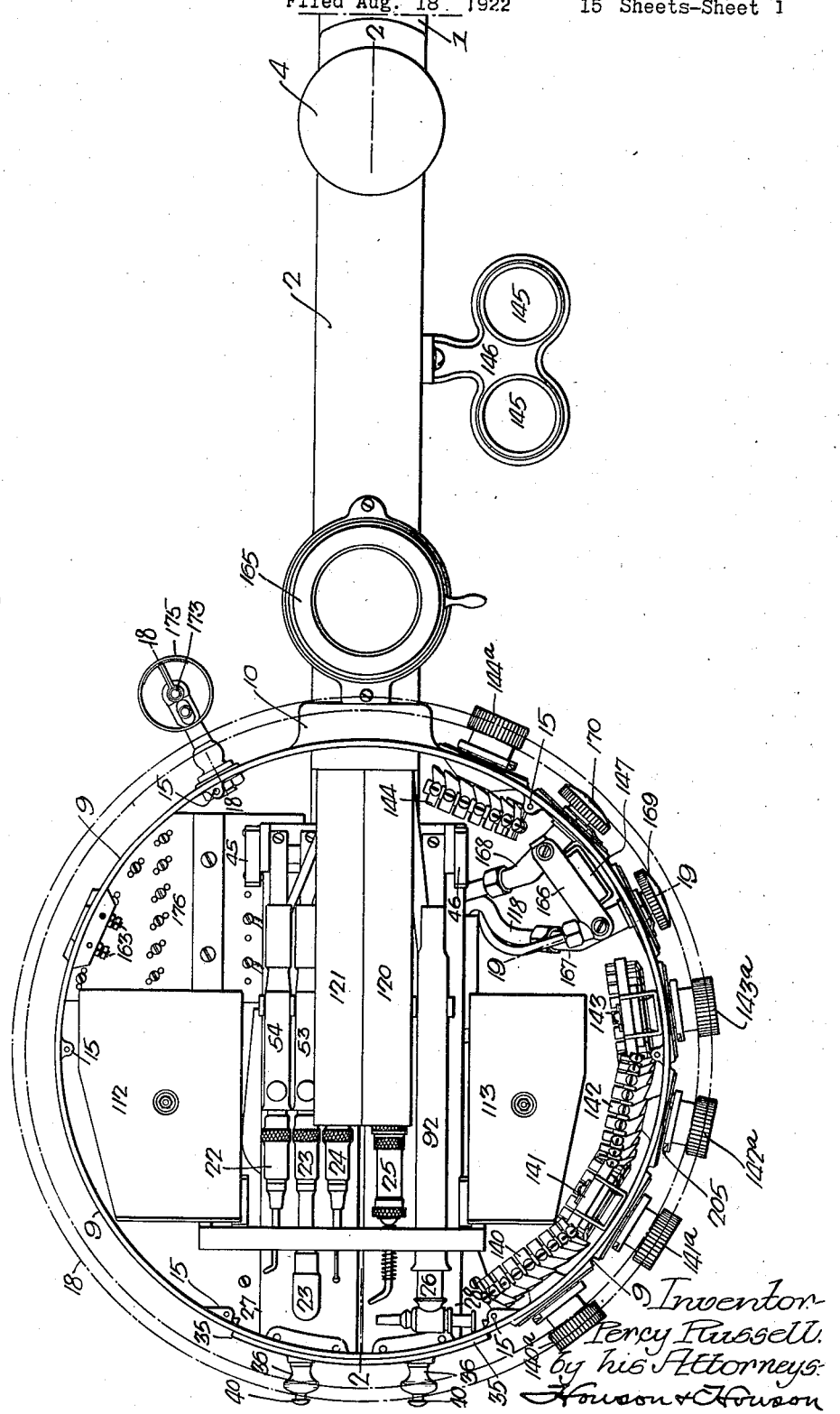

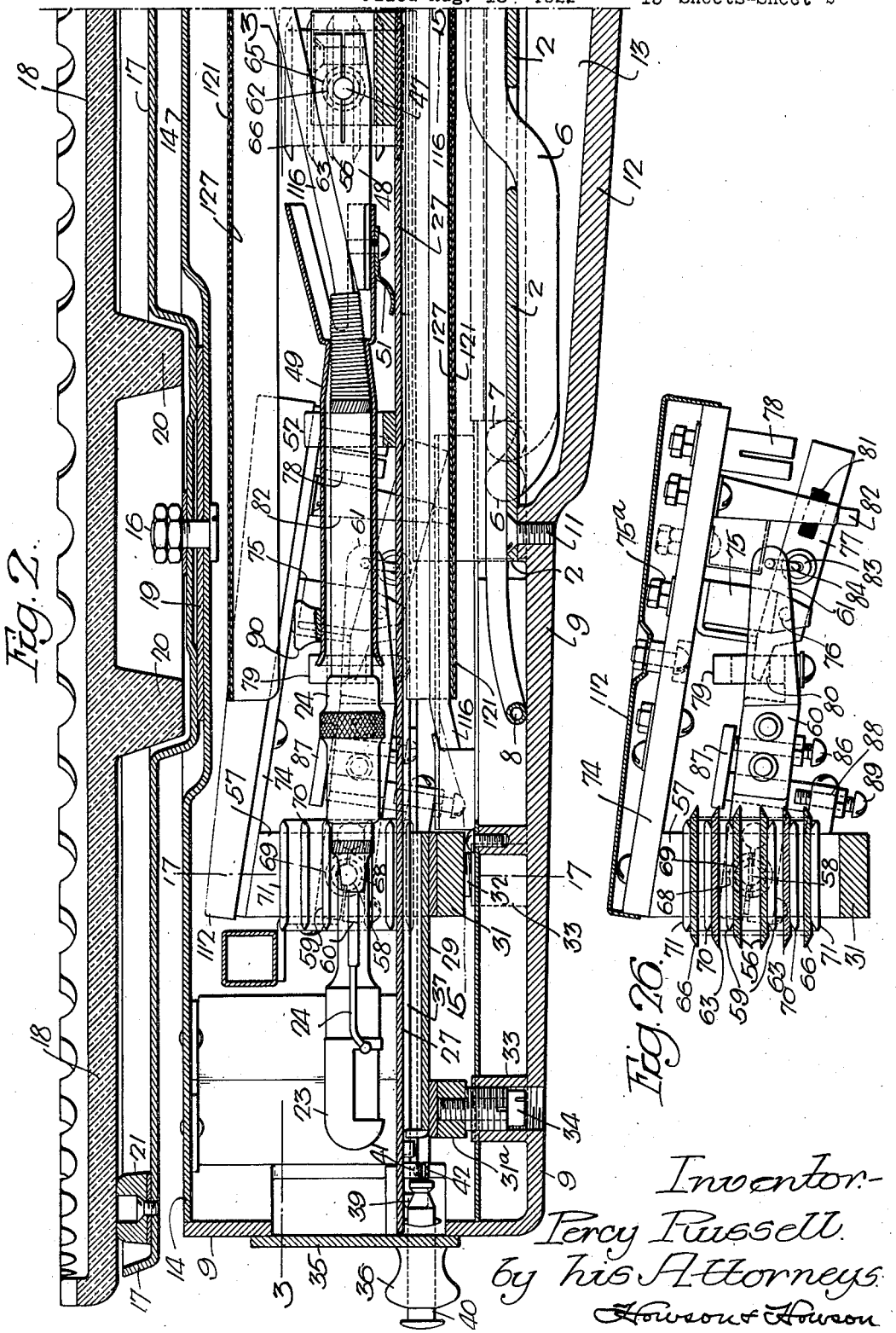

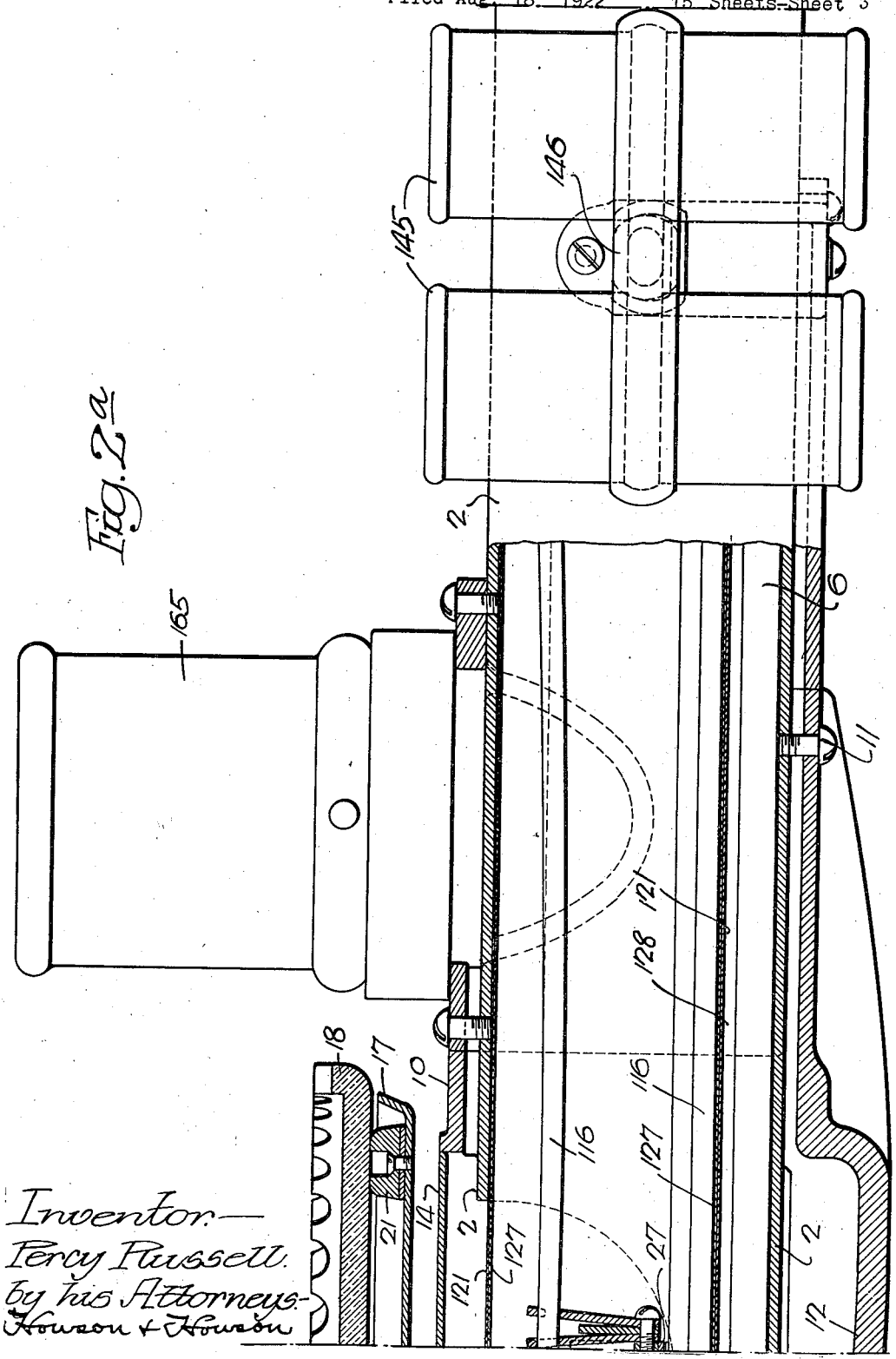

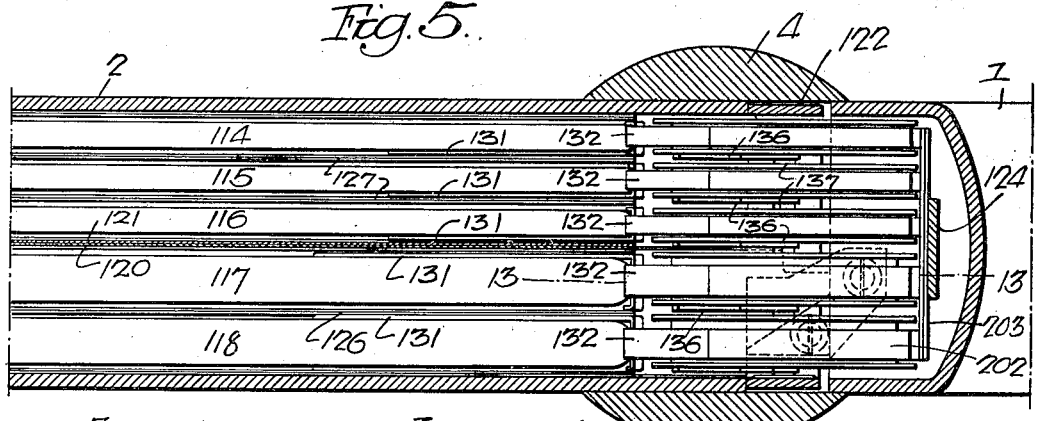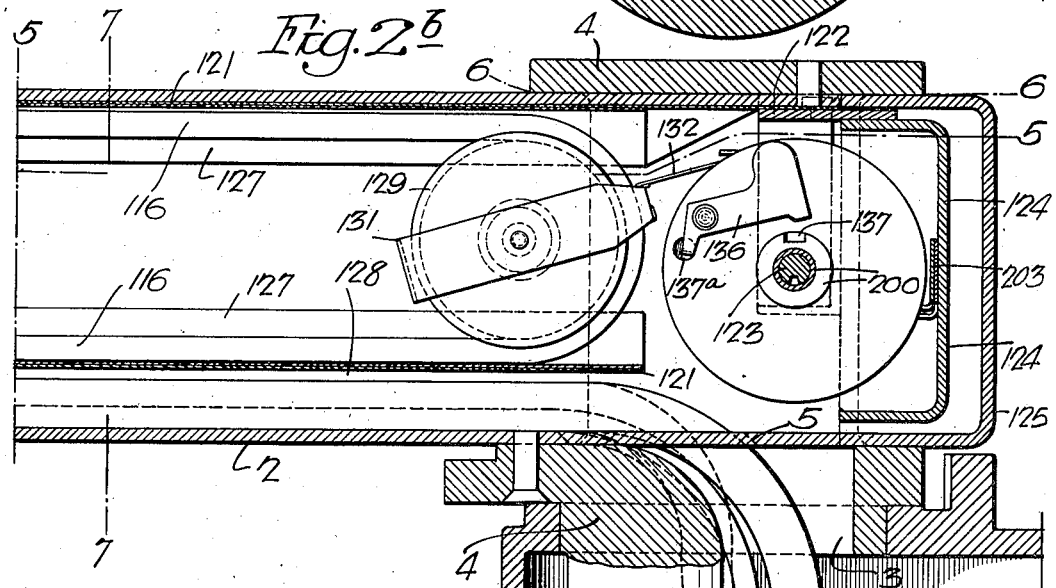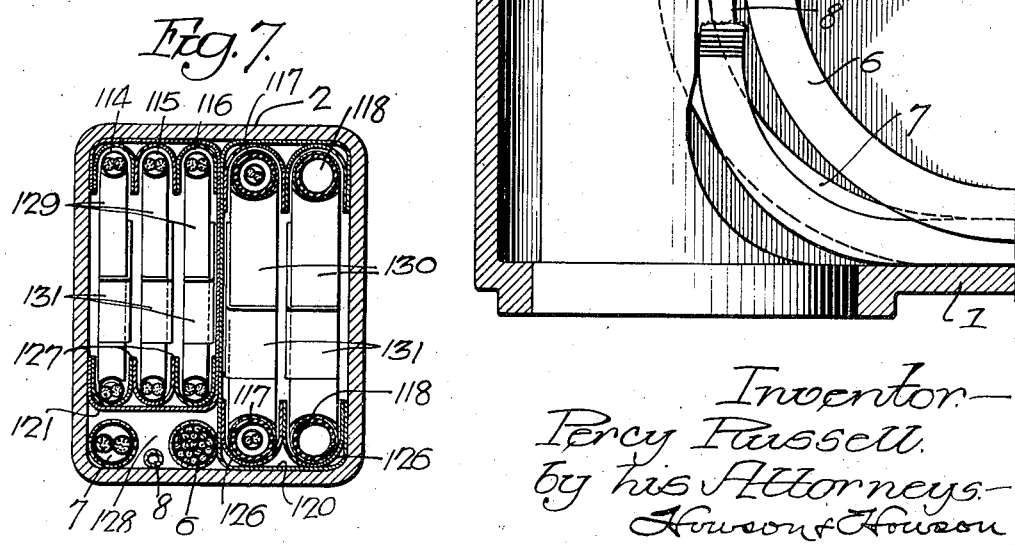

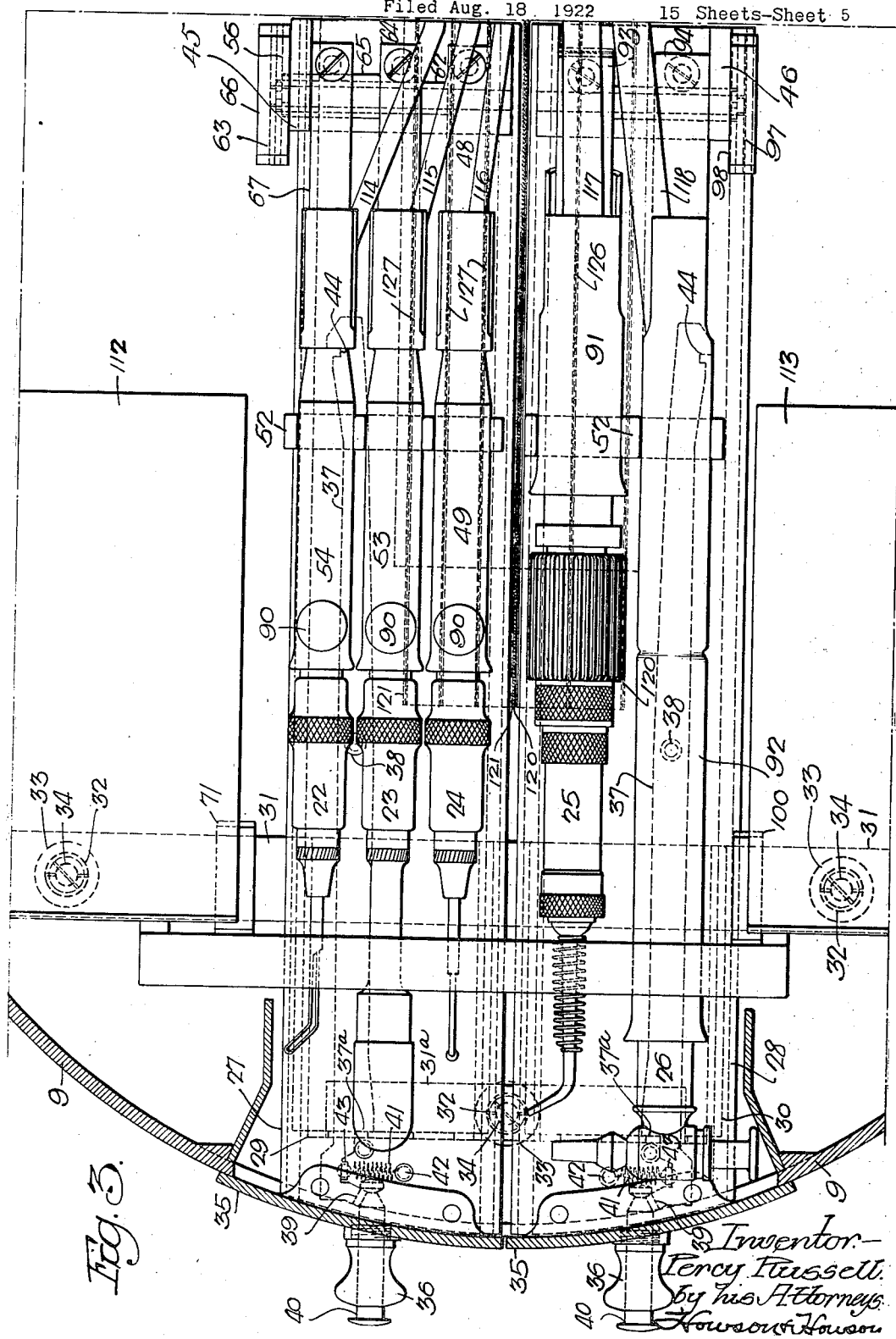

P. RUSSELL 1,491,739

DENTAL SWITCHBOARD BRACKET TABLE

Filed Aug. 18 1922  15 Sheets-Sheet 6

Inventor-
Percy Russell.
by his Attorneys
Howson & Howson

April 22, 1924.
P. RUSSELL
DENTAL SWITCHBOARD BRACKET TABLE
Filed Aug. 18, 1922    15 Sheets-Sheet 7
1,491,739
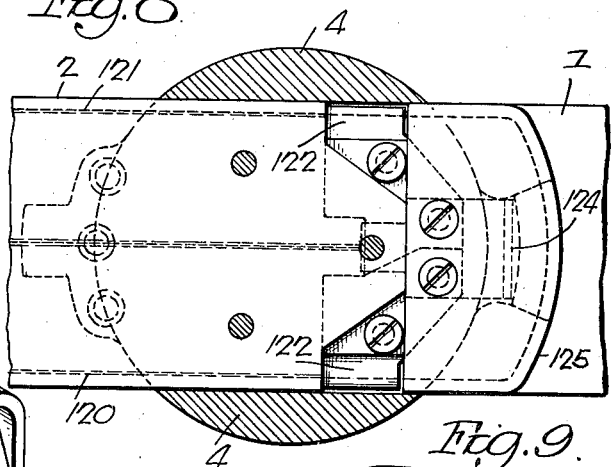
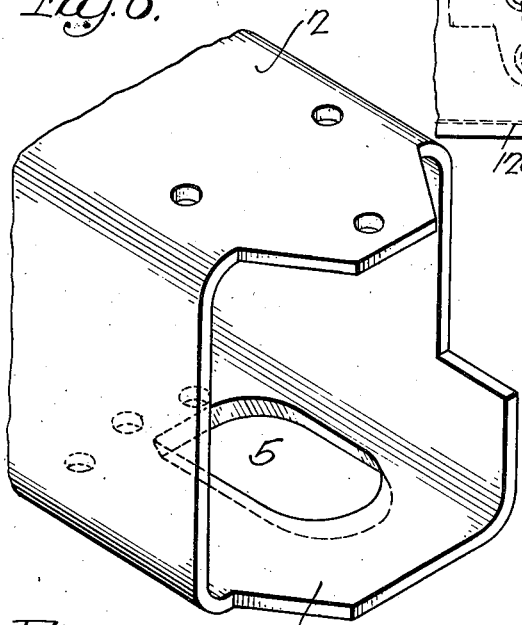
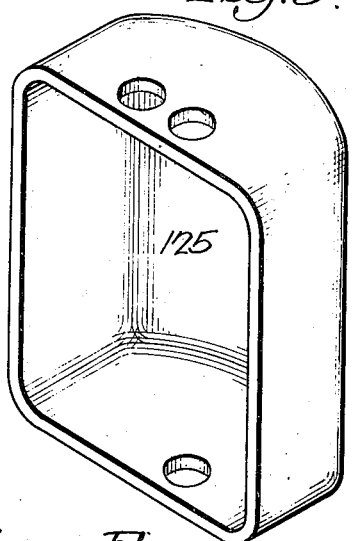
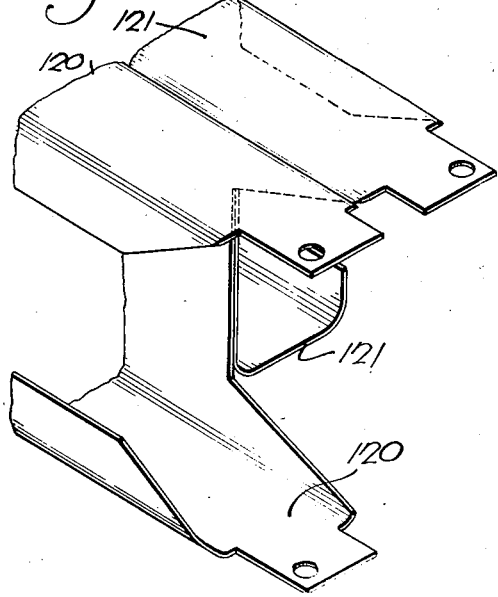
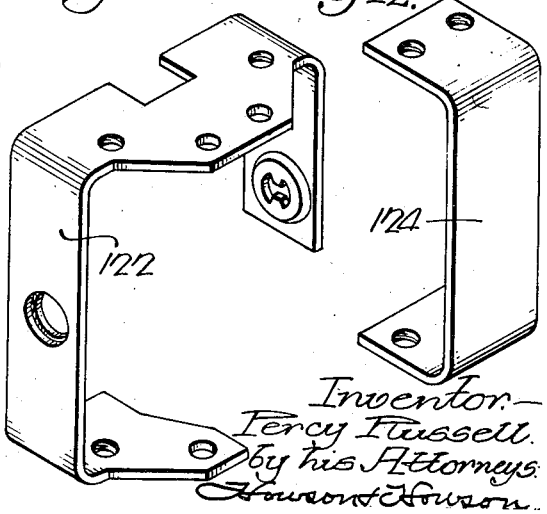
Inventor.-
Percy Russell.
by his Attorneys
Howson & Howson

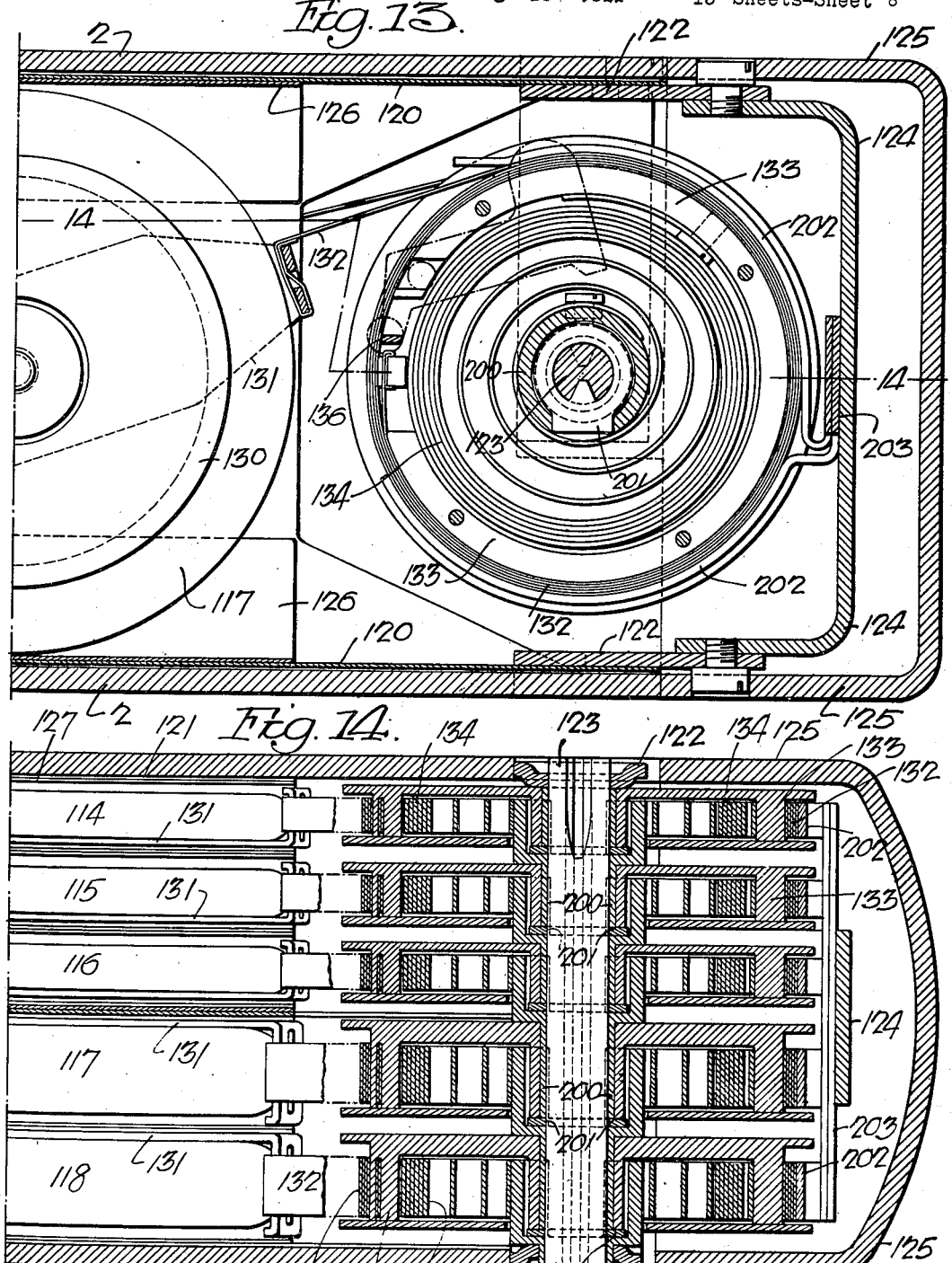

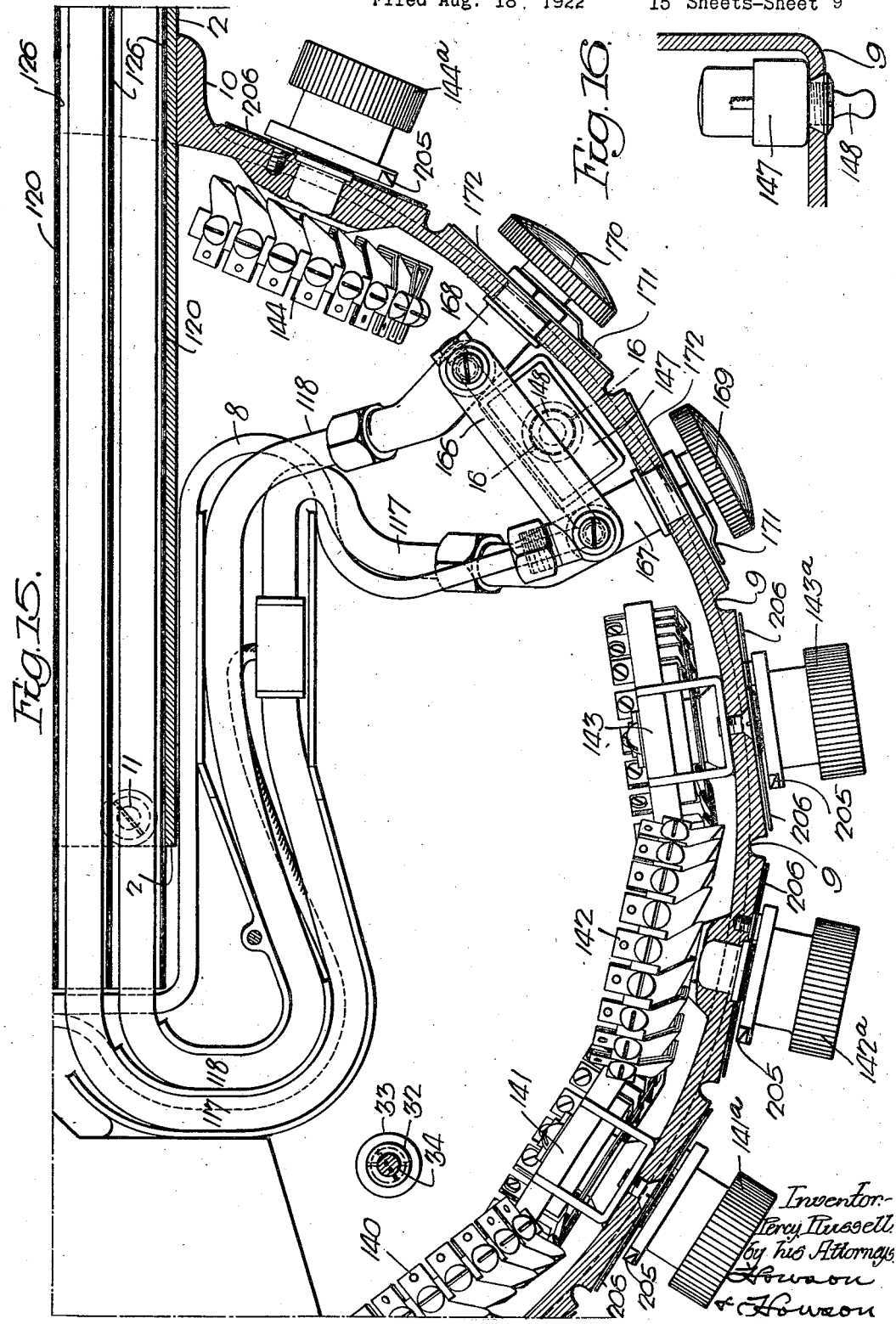

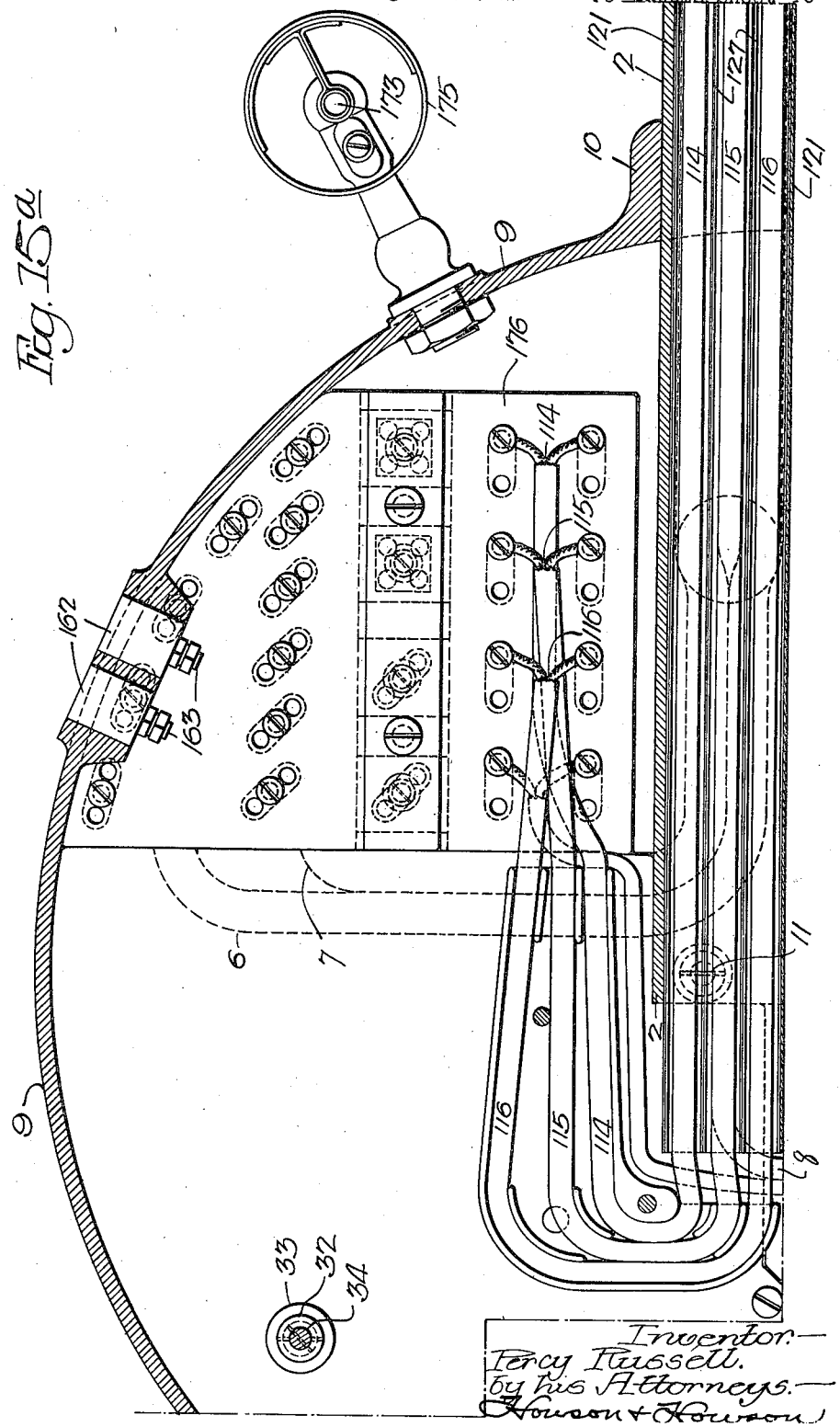

April 22, 1924.
P. RUSSELL
1,491,739
DENTAL SWITCHBOARD BRACKET TABLE
Filed Aug. 18, 1922  15 Sheets-Sheet 11
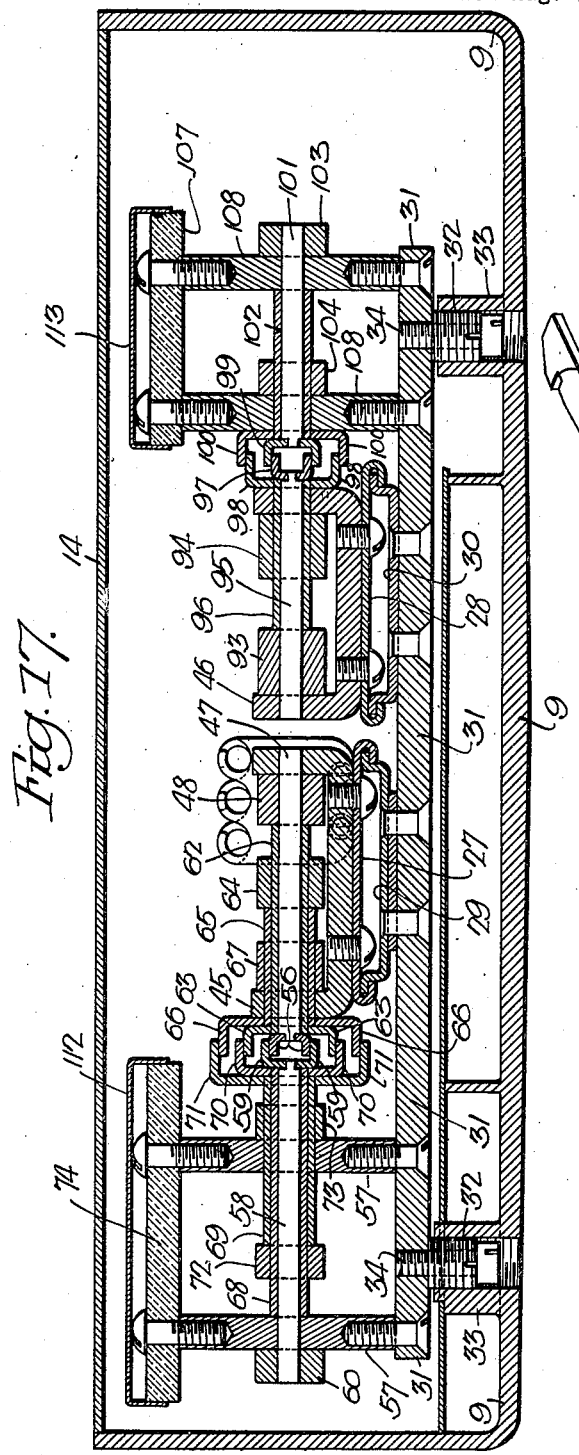
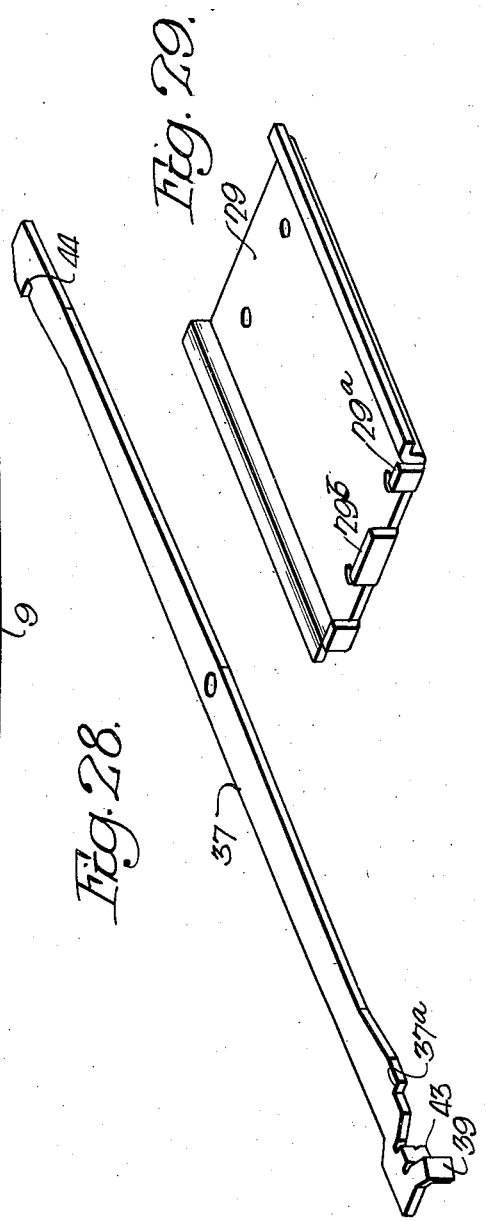
Inventor-
Percy Russell.
by his Attorneys
Howson & Howson April 22, 1924.

P. RUSSELL

DENTAL SWITCHBOARD BRACKET TABLE 1,491,739

Filed Aug. 18, 1922   15 Sheets-Sheet 12

Inventor.—
Percy Russell,
by his Attorneys.—
Howson & Howson

April 22, 1924.
P. RUSSELL
DENTAL SWITCHBOARD BRACKET TABLE
Filed Aug. 18, 1922    15 Sheets-Sheet 13
1,491,739
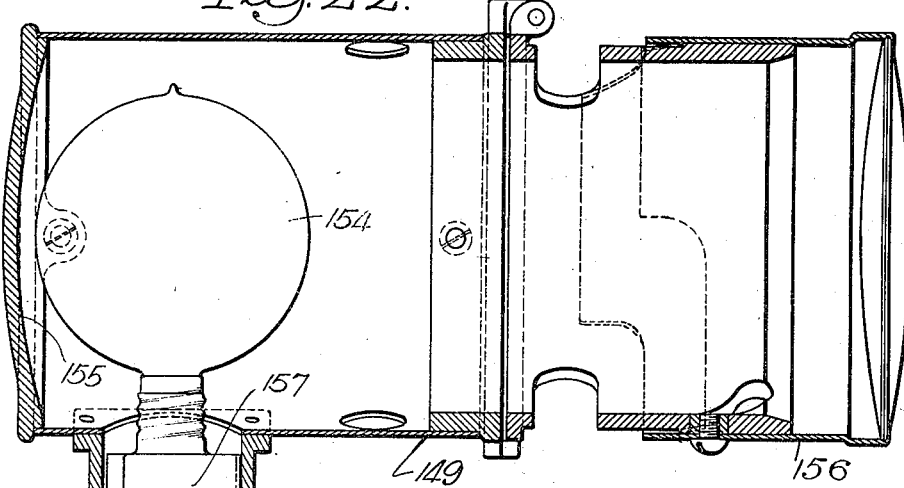
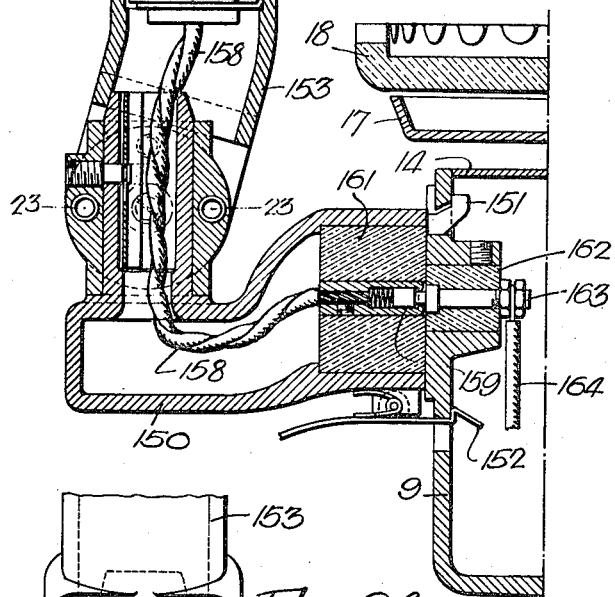
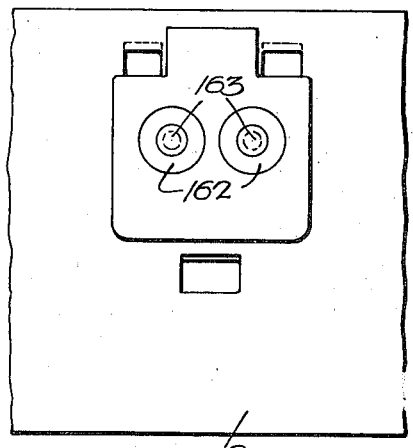
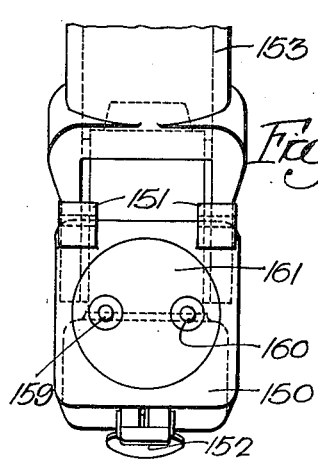
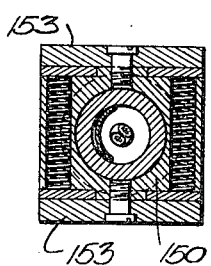
Inventor.-
Percy Russell.
by his Attorneys.
Howson & Howson April 22, 1924.
P. RUSSELL
DENTAL SWITCHBOARD BRACKET TABLE
Filed Aug. 18, 1922    15 Sheets-Sheet 14
1,491,739
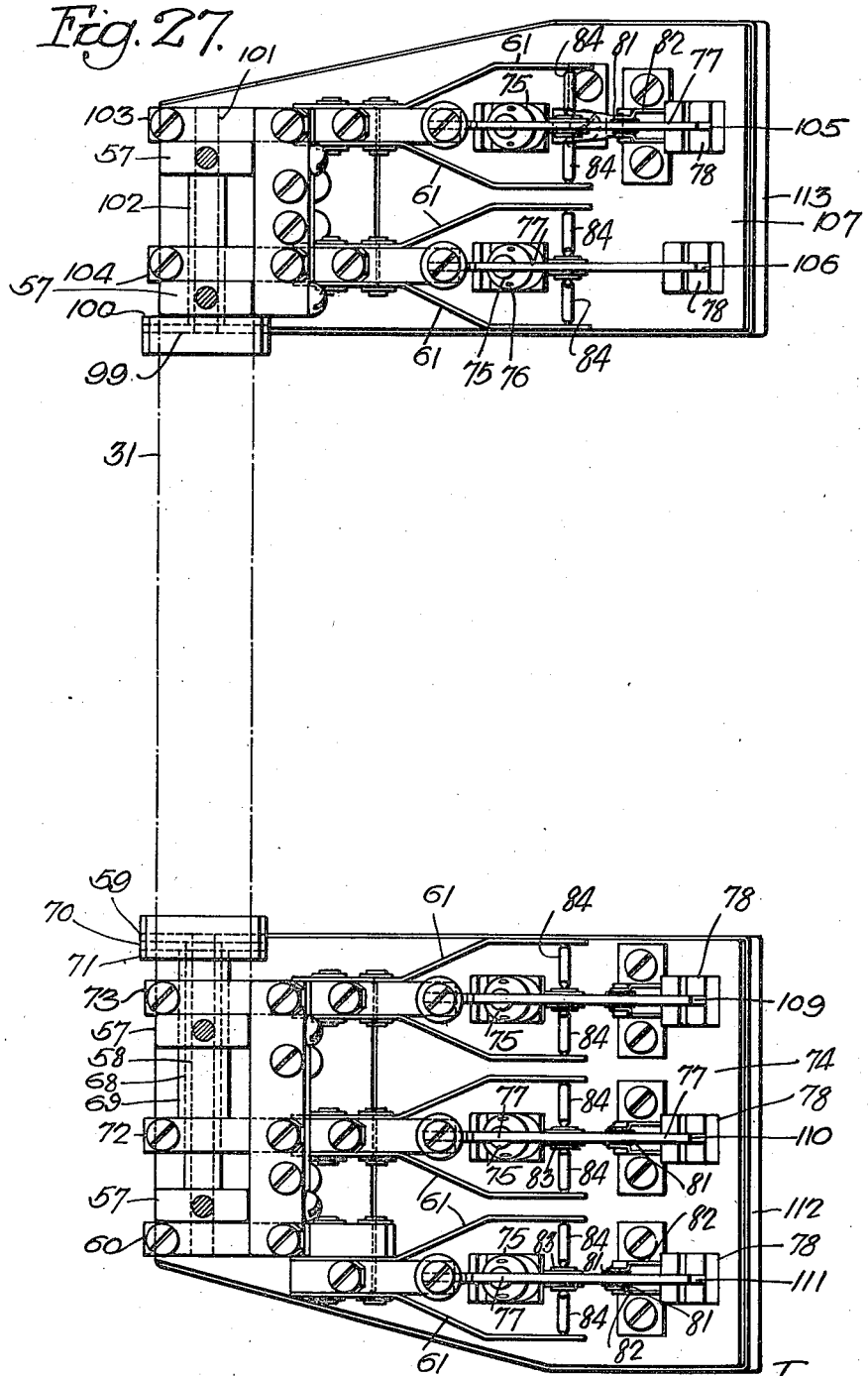

April 22, 1924.

P. RUSSELL 1,491,739

DENTAL SWITCHBOARD BRACKET TABLE

Filed Aug. 18, 1922   15 Sheets-Sheet 15

Inventor –
Percy Russell.
by his Attorneys –
Howson & Howson

Patented Apr. 22, 1924.

1,491,739

UNITED STATES PATENT OFFICE.

PERCY RUSSELL, OF SWARTHMORE, PENNSYLVANIA, ASSIGNOR TO ELECTRO DENTAL MANUFACTURING COMPANY, OF PHILADELPHIA, PENNSYLVANIA, A CORPORATION OF PENNSYLVANIA.

DENTAL SWITCHBOARD BRACKET TABLE.

Application filed August 18, 1922. Serial No. 582,732.

*To all whom it may concern:*

Be it known that I, PERCY RUSSELL, a citizen of the United States, residing in Swarthmore, Pennsylvania, have invented a Dental Switchboard Bracket Table, of which the following is a specification.

The present invention relates to apparatus for use in a dental office where a plurality of instruments and articles are to be used by the dentist in the treatment of a patient, which instruments and articles should be so disposed that they may be readily available for use when required. In such apparatus now in use the various articles, instruments, and the like are generally more or less scattered and switches and controlling means are generally placed at a distance from the place of operation and from the instruments themselves, so that their convenient and satisfactory control is not possible.

The present invention therefore has for one of its objects the assembly into a unitary structure of a majority of the electrical and compressed air instruments and apparatus required for use by a dental operator and the assembly with such instruments and apparatus in the same unitary structure of the various controlling means, such as switches, valves and the like, required for a proper adjustment and use of said instruments and apparatus.

A further object of the invention is to so assemble the various instruments and apparatus into a unitary structure that the whole may be in compact form and require but little space, said apparatus being so arranged within the unit that said instruments are readily available for use.

Another object is to provide novel means for disposing various dental instruments within a container in such manner that while they are normally protected from dust, etc., when not in use, they are at all times connected to sources of energy and may be readily withdrawn from said container when desired for operating purposes.

I also desire to provide a plurality of rheostatic switches as a part of the unit, so disposed thereon as to be readily accessible for the purpose of controlling the flow of electric current to a plurality of current-actuated instruments, and the invention also includes a novel arrangement of the controlling means for the air-actuated instruments and apparatus required in dental work.

A still further object is the provision of novel means for supporting the flexible cables to which the various instruments are attached in such manner that said cables cannot become tangled and will always be disposed in substantially straight lengths without possibility of kinking.

I also desire to provide novel means for retaining each individual instrument in its extended position while it is being used by the dentist and at the same time locking the supporting means for the instrument cable so that it cannot be withdrawn into its casing or supporting structure until desired, the arrangement being such as to readily permit the cable to be retracted or retrieved, when the dentist has completed his work with the instrument, and it is to be returned into the compartment from whence it came.

Another object is the provision of means controlled by each electrical instrument whereby the withdrawal from its normally inoperative position into position for subsequent operation or use will serve to automatically complete an electric circuit in which it is connected and cause the flow of electrical current to the instrument, the arrangement and construction being such as to break said circuit upon a return of the instrument or apparatus to its normal inoperative position.

A further object of my invention is the provision of means for preventing the completion of an electric circuit or circuits by one or more instruments or apparatus, unless the supporting means within which such instruments or apparatus are normally mounted, has been withdrawn from the containing casing within which it is normally disposed.

The invention also contemplates the provision of means for locking any of several compartments in which the instruments are mounted both in their closed and also in their open positions and the further provision of means whereby said locking means is adapted to readily cause release of said compartments at the desired time.

A still further object is the provision of means for adjusting the movable compartments or slides of the unit to take up or compensate for any wear, distortion, or warping of the same so that they will always be maintained in an easily operable condition.

Another object of the invention is the provision of a novel combination with said unit of certain exterior devices, together with the switches for controlling the electric circuits in which said devices are included or with which they are associated.

These objects and other advantageous ends I attain as hereinafter set forth, reference being had to the accompanying drawings, in which, Fig. 1 is a plan of my improved dental unit, the cover being removed and the table being indicated in broken lines;

Figs. 2, 2ª and 2ᵇ are sequential, longitudinal, vertical sections, taken on the line 2—2—, Fig. 1 and on an enlarged scale;

Fig. 3 is a fragmentary plan partly in horizontal section, taken on the line 3—3—, Fig. 2;

Figure 4:
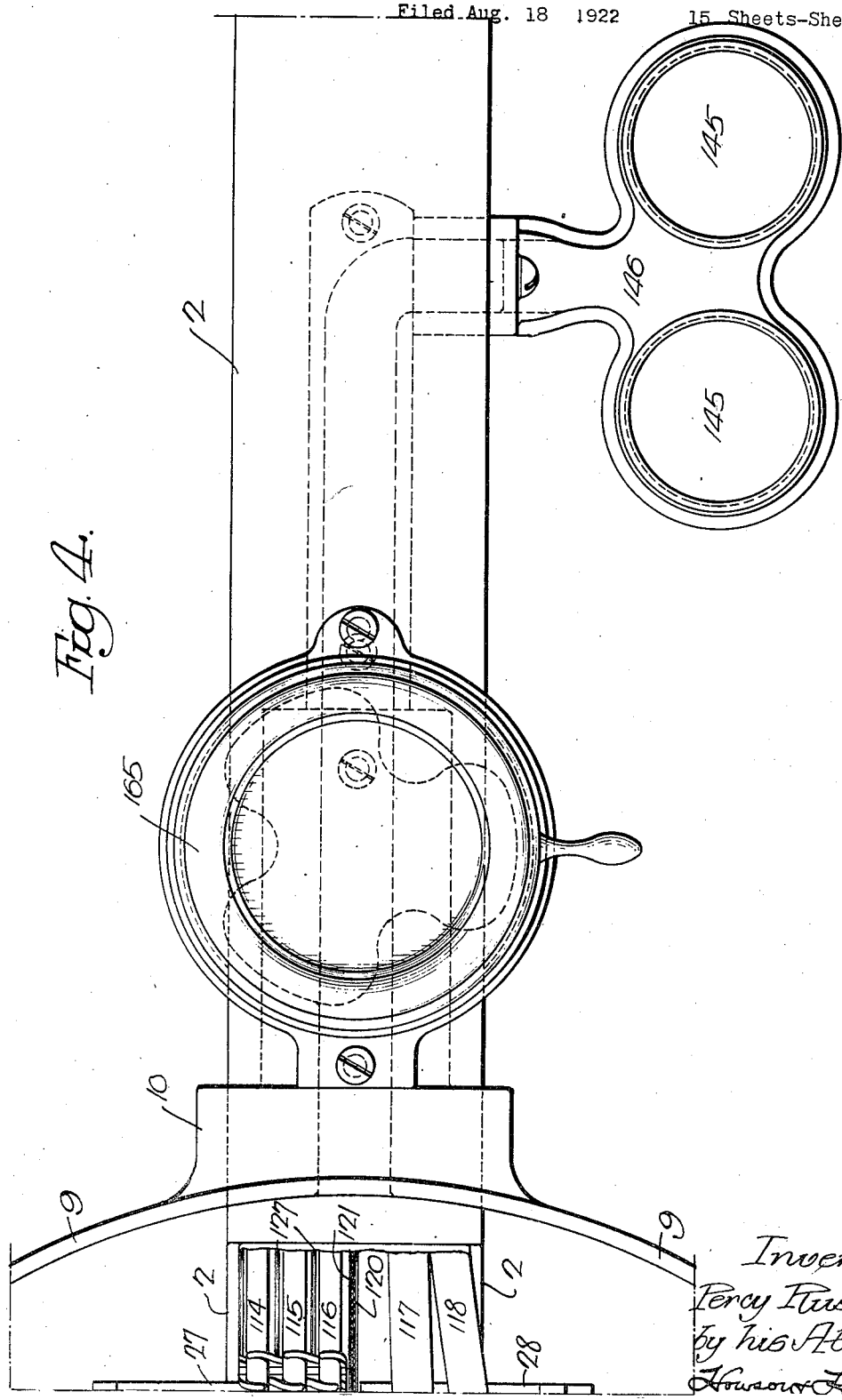
Fig. 4 is a plan of that portion of my invention shown in Fig. 2ª.
Figure 18:
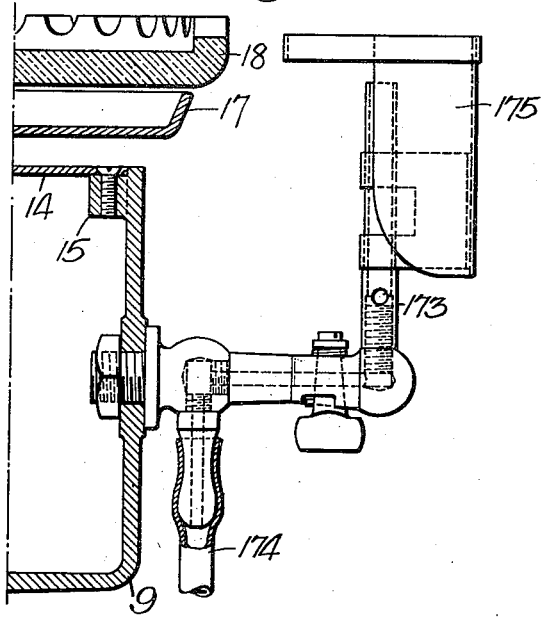
Figure 19:
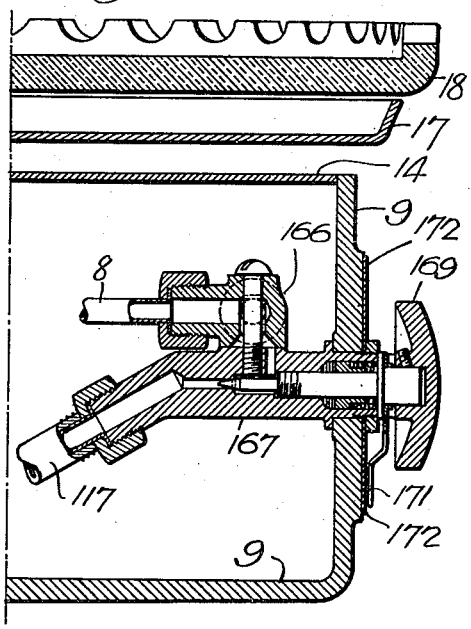
Figure 21:
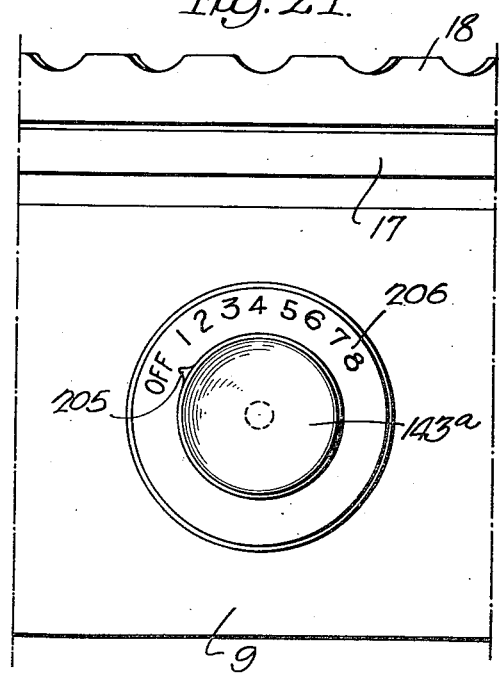
Figure 20:
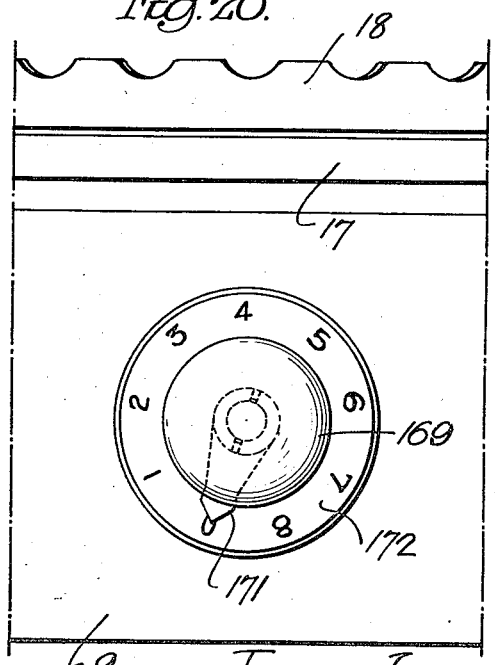

Figs. 5 and 6 are horizontal sections taken respectively on the lines 5—5 and 6—6, Fig. 2ᵇ;

Fig. 7 is a transverse section on the line 7—7, Fig. 2ᵇ;

Figs. 8 to 12 inclusive are perspective views of certain details of the structure shown in Fig. 2ᵇ;

Fig. 13 is an enlarged section taken on the line 13—13, Fig. 5;

Fig. 14 is a horizontal section taken on the line 14—14, Fig 13;

Figs. 15 and 15ª are horizontal sections taken on the line 15—15, Fig. 2;

Fig. 16 is a fragmentary vertical section taken on the line 16—16, Fig. 15;

Fig. 17 is a vertical section taken on the line 17—17, Fig. 2;

Figs. 18 and 19 are vertical sections taken on the lines 18—18 and 19—19, respectively, Fig. 1;

Figs. 20 and 21 are front elevations, showing one of the air valve dials and one of the electric switch dials respectively.

Figure 30:
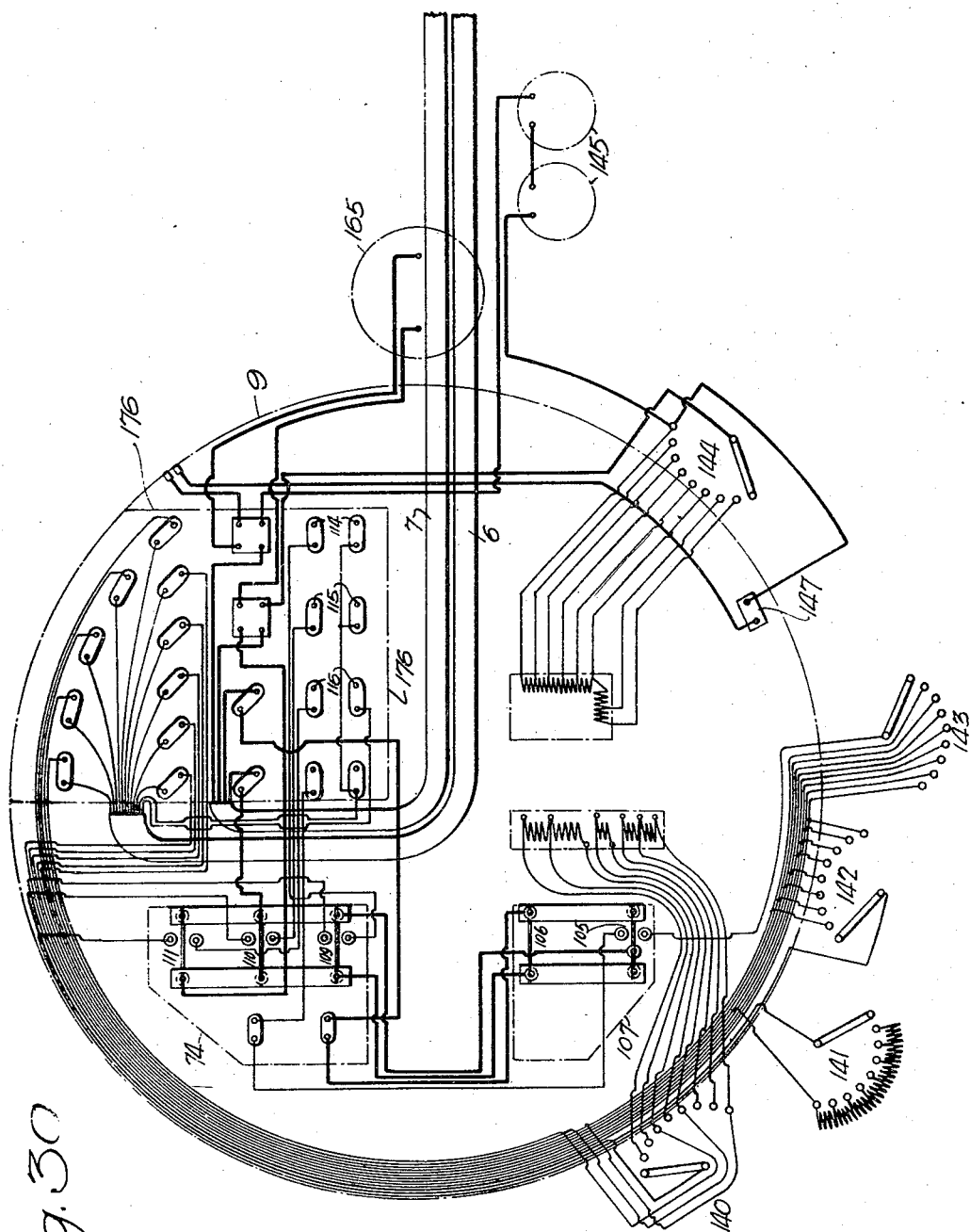

Fig. 22 is a vertical section of a detachable radioscope used in connection with and forming part of my invention;

Fig. 23 is a section on the line 23—23, Fig. 22;

Fig. 24 is a fragmentary elevation of the radioscope, showing the means whereby it is mounted for use;

Fig. 25 is a fragmentary elevation of that portion of the apparatus to which the radioscope is attached;

Figs. 26 and 27 are respectively a side elevation partly in vertical section and an inverted plan of the electric switch mechanism controlling the flow of electric current to the various instruments and aparatus associated with or forming part of my invention;

Figs. 28 and 29 are perspective views of one of the drawer latches and one of the drawer guides respectively; and Fig. 30 is a diagram of the electrical apparatus and connections forming part of my invention.

In the above drawings, 1 represents a portion of a hollow arm or bracket which, while it may be supported in any suitable manner, is customarily journaled on a suitable pedestal or column so as to be free to swing in a horizontal plane. Mounted on the outer or free end of this arm and also free to swing horizontally relatively thereto is a second arm 2 whose hollow interior communicates with the cavity of the arm 1 through a passage 3 formed in a pivot structure 4 which is rotatably mounted in a suitable bearing in said first arm 1.

In the case illustrated, the pivot structure 4 is of generally cylindrical form and while its lower portion is free to rotate within the vertical bearing of the arm 1, its upper part is provided with a transverse passage or opening for the reception of one end of the second arm 2, which is rigidly held to it by any suitable means. Both of the arms 1 and 2 are preferably, though not necessarily, of substantially rectangular section and there is formed in the bottom of the second of these arms an opening 5 communicating with the passage 3 of the pivot member 4 to permit of the passage of cables 6 and 7, each made up of a number of electrical conductors, and also a conduit 8 for compressed air, their arrangement being such that the relative movement of the arm 2 on the arm 1 is permitted without injury to said cables or conduit.

The forward or free end of the arm 2 extends into the side of and is rigidly connected to a flat cylindrical body or casing 9 constituting a dental instrument control cabinet which may be a pan-shaped casing having a boss 10 for the reception of said arm. The latter does not terminate in the boss but, as shown in Figs. 2 and 2ª, its bottom wall projects well toward the middle of said casing 9 to which it is rigidly connected by suitable means such as screws 11;—the bottom of the casing being depressed as indicated at 12, immediately under this extended bottom side of the arm, to form a chamber 13.

The otherwise open top of the casing 9 is normally closed by a circular plate 14 (Figs. 2 and 17) held in place by screws passing through it into lugs 15 on the inner walls of the casing 9. This cover plate has a central circular depression, at the center of which is mounted a pivot screw 16 serving to rotatably hold to it a shallow metallic pan 17, which in turn carries a glass tray 18 of substantially circular outline. A bearing washer 19 is mounted on the pivot 16 between the cover 14 and the centrally dished bottom of the pan 17, and said pivot screw preferably has nuts threaded on its upper end to retain the parts together.

The glass tray 18 has an annular rib or flange 20 projecting centrally down from its under side and designed to more or less closely fit into the dished central portion of the pan 17, the edge of said tray being upwardly flanged and preferably notched or serrated as shown in Figs. 2 and and 2ª for the purpose of so holding dental instruments as to prevent their rolling. The tray 18, while prevented from lateral displacement by reason of the extension of its portion 20 into the dished central portion of the pan 17, is supported on rubber buttons 21 held in any suitable manner to the outer portions of said pan, whose outer edge is upwardly flanged.

The hollow casing 9 is designed to receive, support and normally house a number of dental instruments such as an electrically heated cautery 22, an electric mouth lamp 23, an electrically heated applicator 24, an air jet instrument 25 for cleaning cavities by air under pressure, and a valved air head 26 for attachment to ejecting or other apparatus actuated by air under pressure. Obviously other instruments may be housed in the body in addition to or in place of those named, but I have illustrated those noted as typical. In the present instance the electrically-actuated instruments 22, 23 and 24 are mounted on a slide or drawer structure 27, while the air-delivering instruments 25 and 26 are mounted on a second slide or drawer structure 28.

These slides consist of elongated metallic plates having their longitudinal edges turned down and bent in toward each other to form grooves for the reception of guides or tracks formed by the upwardly and outwardly flanged edges of a pair of plates 29 and 30 respectively which are mounted on a relatively heavy bar 31 extending transversely of and parallel with the bottom of the casing 9. This bar is adjustably carried on tubular screws 32 threaded into bosses 33 projecting upwardly from the bottom of the casing 9, and these screws are made tubular for the reception of other screws 34 threaded into said bar to hold it against the screws 32. By this means said bar with the apparatus which it carries may be assembled outside the casing and after being placed therein as a sub-unit, may be accurately adjusted as to its height and level.

The side of the casing opposite the arm 2 is provided with two substantially rectangular openings in the line of movement of the slides 27 and 28, so as to permit of these being drawn out of the casing and each of said slides has mounted upon its outer end a plate 35 (Fig. 2) which, when the slide has been moved as far as possible into the casing, closes the opening thereof. Each of said end plates has a knob or handle 36 and is provided with suitable means whereby its outward movement is limited and it may be retained either in its full outer or in its inner position. For this purpose an elongated lever 37 (Fig. 28) is pivoted by a screw or rivet 38 (Fig. 3) to the under side of each slide and the forward or outer end of such lever is provided with a laterally projecting portion 39 designed to coact with the conically formed inner end of a plunger 40 slidably mounted in the knob or handle 36.

The projection 39 of each lever is drawn toward its plunger by a spring 41 extending between a post 42 mounted on the under side of the slide and a lug 43 on the end of the lever. This spring normally holds the lever in such position that a shoulder 37ª extends behind an abutment 29ª on the plate 29 so as to hold the slide in its innermost or concealed position. If now the plunger 40 be pushed inwardly, the lever 37 is turned on its pivot sufficiently to permit its shoulder to clear the abutment on said plate and allow the slide to be moved outwardly. The action of the spring 41 on the lever is such that as the slide is moved outwardly, said lever bears against a second abutment 29ᵇ on plate 29 so that when the slide reaches its full outer position, said abutment enters a notch 44 in the inner end of the lever, not only holding the drawer from further outward movement but preventing its inward movement until the lever has been again turned to its disengaging position by inward movement of the plunger 40. Each of the plungers 40 is so made as to be removable at will, whereupon the spring 41 so moves the lever 37 that the slide is locked thereby in its outer or inner position as the case may be.

The inner ends of the slides 27 and 28 have rigidly fixed to them substantially U-shaped bearing pieces 45 and 46 respectively, and the first of these has journaled in its arms a shaft 47 on which is rigidly clamped a carrier arm 48 projecting over the slide 27 (Figs. 2, 3 and 17). This arm has rigidly fixed to its forward end an elongated tubular casing 49 constituting a holder having its outer or forward end of bell mouthed form and designed to slidably receive one of the electro-dental instruments,—in the present instance the applicator 24. This tubular holder 49 extends longitudinally of the slide 27 and its forward end is preferably spaced such a distance from the end plate 35 thereof to prevent the instrument 24 being drawn out until the end holder has been swung upwardly on its pivot;—it being understood that this instrument is supplied with current through a flexible cable which extends rearwardly out of said holder.

A foot 51 (Fig. 2) is attached to the underside of the rear end of the holder 49 so that the latter when in its normal position, is supported substantially parallel with but some distance above the upper face of the slide 27, and said holder is laterally guided by the vertically extending arms of a spacing plate 52 extending transversely of and fixed to said slide about midway of the length of said holder. This same spacing plate has other arms to laterally guide and position other tubular holders 53 and 54 also mounted on the slide and whose construction is similar to that of the holder 49 but which are designed for the reception of other instruments such as the mouth lamp 23 and cautery 22.

It is desired that these three electric instruments 22, 23 and 24 shall be normally cut off from their source or sources of current supply as long as the slide on which they are mounted is in any but its fully projected position outside of the casing 9, and even then shall not be connected to said source unless the proper holder 49, 53 or 54, as the case may be, is swung upwardly through a predetermined angle. For this purpose I provide electric switches for said instruments respectively, together with mechanism whereby said switches will be operatively connected to the instrument holders only when the slide and said holders are in their full outer position. Said mechanism includes means whereby the swinging upward through a small angle of any one of the holders will cause closing of its particular switch and a resultant current flow to the instrument associated with said holder. The return of the holder to its normal position, in which it is substantially parallel with the line of the slide, causes opening of the switch and cutting off of current from the instrument, while the inward movement of the slide to its closed position within the casing 9 disconnects the two parts of the switch-operating mechanism and leaves the switches in their open positions.

In order to secure this mode of operation, I fix to that end of the shaft 47 distant from the slide 28 a channel-shaped element 56 (Fig. 17) having its side flanges substantially horizontal and extending substantially parallel with the line of movement of the slide 27. On the base or cross bar 31 adjacent this end of the shaft 47 I provide a pair of upwardly extending bearing posts 57—57 and in them journal a second shaft 58 axially in line with the shaft 47 when the slide on which the latter is mounted is in full outer position. On that end of this shaft 58 adjacent the shaft 47 I provide a second channel-shaped element 59 of such dimensions and so mounted that it will receive between its flanges or side members and closely fit the element 56 when the slide 27 on which the latter is mounted is moved to its outermost position. When the two channel elements 56 and 59 have been thus engaged with each other as shown in Fig. 17, it is obvious that they, and hence the shafts 47 and 58 on which they are mounted, are operatively coupled, so that an oscillatory or rotary movement of one will be transmitted to the other. On the outer end of the shaft 58 I clamp a rearwardly extending arm 60 (Figs. 26 and 27) having mounted on its free end a pair of spring fingers 61—61 for actuating the movable member of an electric switch.

Coaxially mounted upon the slide-carried shaft 47 is a tubular shaft 62 having fixed to its outer end a channel-shaped element 63 and also having clamped to it an arm 64 which carries the instrument holder 53. Rotatably mounted on this second shaft is a third shaft 65 carrying on its outer end a third channel-shaped element 66 and having clamped to it a third arm 67 on which is mounted the instrument holder 54. From Fig. 17 it will be noted that the channel shaped elements 56, 63 and 66 are respectively mounted on the three coaxial shafts so that they are nested one within the other,—the outer edges of all of their flanges terminating in or immediately adjacent the same plane.

The shaft 58 has coaxially mounted upon it two tubular shafts 68 and 69, respectively having fixed to their ends channel shaped elements 70 and 71 nested with the element 59 and having the edges of their side members or flanges terminating in the plane including its side edges. Like the two elements 56 and 59, the two pairs of elements 63—70 and 66—71 coact or are operatively coupled when the slide 27 is in its full outer position, so that angular movement or rotation of the shaft 62 is transmitted to the shaft 68, while similar movement of the shaft 65 is independently transmitted to the shaft 69. The shaft 68 has clamped to it a projecting arm 72 and the shaft 69 has clamped to it a similar arm 73.

Each of the arms 60, 72 and 73 controls or actuates an electric switch and inasmuch as all of these switches are of substantially similar construction, but one of them will be described in detail. Said switches themselves are carried by and preferably depend from a plate 74 of insulating material such as vulcanized fibre, bakelite, or the like, which is rigidly mounted upon the tops of the bearing posts 57. Each switch (Figs. 26 and 27) consists essentially of a metallic post 75 having a threaded end projecting through the plate 74 and held in position by one or more nuts 75ª. The lower end of this post is preferably slotted or forked and carries a switch blade 77 mounted on a pivot 76. The outer or free end of this blade is designed to coact with a fixed contact 78 supported by the base plate and the opposite end of said blade is extended between a pair of abutments 79 and 80 carried by the arm 60, so that movement of said arm up or down will move the switch blade 77 upon its pivot 76 in one direction or the other to a predetermined extent.

The blade 77 has mounted upon its opposite sides strips 81 of insulating material so positioned as to force apart or electrically separate a pair of spring contacts 82—82 when said blade moves to its open position away from the fixed contact 78. The parts are so designed that when said blade is in its closed position, i. e.,—between the spring clips of the contact 78, the free or outer ends of the spring contacts 82 can electrically engage each other.

The blade 77 has on its sides a pair of sockets 83 designed for the reception of the ends of pointed pins 84, whose outer and similarly pointed ends extend into depressions or sockets in the outer or free ends of the spring fingers 61 respectively, and the various parts are so arranged and assembled that when the operating arm 60 with its spring finger 61 is swung downwardly through a small angle by reason of a rotary movement of its shaft 58, the ends of the spring fingers 61 carry the outer ends of the pins 84 down below a line passing through the center of the sockets 83 and perpendicular to the switch blade 77. Immediately thereafter the abutment 79 of the arm 60 strikes the projecting end of the blade and moves this on its pivot 76 so that its opposite end moves toward the fixed contact 78.

Owing to the pressure of the spring fingers 61 toward the switch blade 77, the latter is immediately moved by such pressure transmitted through the pins 84, to a position in which it is fully and instantaneously engaged with the fixed contact 78 and at the same time the spring contacts 82 are allowed to engage each other. Similarly when the arm 60 is swung upwardly, the spring fingers 61 first carry the outer ends of the pins 84 above the line of the sockets 83, after which the abutment 80 of said arm begins a movement of the switch blade 77 toward its open position. However before said blade can clear the contact 78, the spring fingers act through the pins to instantaneously move it to its full open position and at the same time separate the contacts 82 which constitute a secondary switch.

In the case of the switch controlled by the holder 91 for the heated air instrument 25, I preferably provide a third switch consisting of a contact projecting in such position adjacent the blade 77 as to be electrically engaged by the latter when this engages the contact 78 and to be disengaged therefrom when the blade is in its open position.

The angular movement of the arm 60 in an upward direction is limited by the adjustment of a screw 86 carried by said arm in such position as to engage an overlying lug 87 carried by the bearing posts 57 when said arm moves up. A second lug 88, also carried by the bearing posts, has mounted in it a screw 89 which may be adjusted to limit the downward movement of said arm 60.

From the foregoing description it will be understood that as the drawer 27 is moved into its outermost position, the channel elements associated with its instrument holders come into engagement with and are operatively coupled to the channel elements of the above series of switches. Thereafter the slight upward movement of any one of the instrument holders mounted on the drawer, either by an upward pressure exerted upon the instrument within it, or by an upward pull on a knob or handle 90 thereon, will independently close the corresponding one of the aforesaid switches, which is so connected to the current source as to cause current to be supplied to the particular instrument in the holder so moved. The above described quick break mechanism for the switches is of such a nature and has sufficient power to maintain the instrument holder in its raised position until such time as it is forcibly swung downwardly, whereupon the corresponding switch is caused to instantaneously open or disengage its contacts and that in such a manner as will reduce to a minimum the injurious effects of any arc which may be formed.

The two air instruments 25 and 26 are likewise mounted in tubular holders 91 and 92, respectively fixed to a pair of arms 93 and 94 which, through shafts 95 and 96 suitably journaled in bearings carried by the second slide 28 and channel elements 97 and 98, may be operatively coupled through other channel elements 99 and 100, to the coaxial shafts 101 and 102 carrying said latter elements. Of these, the shaft 101 has clamped or otherwise suitably fixed to it an arm 103 and the tubular shaft 102 likewise has clamped to it a second arm 104. The first of these arms controls the operation of a quick break switch 105 and the second similarly controls the operation of a similar switch 106. These two switches are mounted on a plate of insulating material 107 carried by two bearing posts 108 projecting upwardly from the cross bar 31 and while the first of them includes three pairs of contacts, the second has but a single pair.

In the preferred form of my invention each of the three switches 109, 110 and 111 mounted on the plate 74, and also the switch 105, includes two pairs of contacts designed to be simultaneously opened or closed, of which one pair is in circuit with the primary winding of a transformer whose secondary winding is in circuit with the particular instrument associated with that switch and also with the second pair of contacts of the latter. The third pair of contacts associated with the switch 105 is in circuit with a compressor motor for supplying air under pressure to the instruments 25 and 26, while the single pair of contacts of the switch 106 is likewise in circuit with said motor. Obviously therefore the closing of any of the switches 109, 110 or 111 supplies current to the instrument with whose holder it is associated, while in addition the operation of the switch 105 starts the compressor motor so as to cause the delivery of air to said instrument and electrically heats such air. The operation of the holder 92 of the instrument 26 closes a switch which, by similarly starting the compressor motor, causes flow of air under pressure to said instrument.

For protecting the switch terminals and connections otherwise exposed on the top face of the insulating plate 74, I provide this with a cover, preferably in the form of a metallic plate 112 having a lining of insulating material, and similarly provide the switch-carrying plate 107 with a cover plate 113 also lined with insulating material.

As above indicated, all of the electric switches with the slides and instruments mounted thereon are carried on the cross bar 31 so that they may all be readily assembled and adjusted upon this latter outside of the casing 9, and after said bar has been positioned in the casing, may all be adjusted as a unit by means of the screws 32 to properly position the parts with relation to the arm 2 and its associated devices.

In order to permit any one of the instruments carried by the drawers 27 and 28 to be withdrawn from its holder and put into service at a distance from the casing, I provide the three instruments 22, 23 and 24 with electric supply conductors respectively mounted within flexible cables 114, 115 and 116, the air heating instrument 25 with a combined air pipe and current conducting cable 117, and the air supply instrument 26 with an air supply pipe 118.

In order that the conductors comprised by the various cables and air pipes shall be taken up and safely disposed when the instruments are not in use and shall be available for immediate extension to permit of the instruments being withdrawn from their holders and put in service, I provide each of said conductors with an automatic take-up or retrieving attachment, there being in the case illustrated five such attachments mounted within the bracket arm 2.

For this purpose I slidably mount within said arm an elongated metallic frame consisting in the present case of two elongated channel-shaped members 120 and 121 placed with their webs or backs parallel and in engagement and each having the edges of its flanges bent toward each other.

That end of said frame distant from the casing body 9 has extending around it a yoke piece 122 (Fig. 11) to which is non-rotatably fixed a transversely extending supporting spindle 123 (Figs. 13 and 14), and said yoke piece is connected through an intermediate U-shaped member 124 with a concave cover plate 125 formed to fit into or over the opening into the rear end of the arm 2 through which the frame 120—121 with its associated parts may be introduced or removed. The member 120 of the frame (Fig. 7) has fixed in and extending longitudinally of its top and bottom flanges two pairs of parallel tracks or guideways 126, while the frame member 121 has similarly mounted within each of its top and bottom flanges three tracks or guideways 127, it being noted that the vertical height of the frame member 121 is somewhat less than that of the frame member 120, so that there is a space 128 within the arm 2 underneath said second frame member 120, for the passage of the cables 6 and 7 and the air pipe 8, as shown in Figs. 2ᵇ, 5 and 7. Three grooved sheaves 129 are mounted in the guideways or tracks 127 of the frame member 121 and have passing around them the three flexible electric cables indicated at 114, 115 and 116, respectively from the three instruments 22, 23 and 24. Likewise in the tracks 126 are two sheaves 130 around which pass the air pipe 118 of the instrument 26 and the combined pipe and cable 117 from the instrument 25.

For maintaining tension upon each of these cables and pipes and taking up the slack therein whenever this is allowed, I provide suitable tension devices, preferably in the forms shown in Figs. 13 and 14. While these tension devices may have any construction suitable for the work they are designed to perform, I have illustrated them as each consisting of a yoke piece 131 on which one of the five sheaves 129 or 130 is rotatably mounted and to this yoke is connected one end of a flexible metallic or other suitable flexible band or member 132 adapted to be wound upon a spring-actuated drum 133 journaled in any suitable manner upon the fixed spindle 123. In the present case each of the drums has a tubular hub rotatably mounted on a sleeve 200 splined as by washers 201 or otherwise non-rotatably fixed to the spindle 123 and each of said sleeves is extended at one end so as to project over or receive the hub of an adjacent drum, Each drum has mounted within it and is connected to the outer end of a coil spring 134 whose inner end is attached to the extended part of the sleeve 200 and which at all times tends to turn said drum in such a direction as to wind up the band 132 and therefore draw toward it the sheave journaled in the yoke 131 attached to said band. In the case of the spring for the drum associated with the conductor 118, the inner end of said spring is fixed to a sleeve 200$^a$ which like the sleeves 200, is non-rotatably held to the spindle 123 by a washer 201. As a consequence when any one of the instruments 22—26 is drawn out of its holder, the withdrawal of its attached cable or air pipe is resisted by the action of the spring 134 operative upon its sheave 129 or 130. As such withdrawal of the instrument and its cable continues, the sheave 129 or 130 moves in its guides or tracks 126 or 127 within the arm 2 and as soon as the tension on said cable is released it is drawn back under the action of the tension spring 134 exerted through the band 132, yoke 131 and sheave, the instrument finally coming to rest in its holder. It is noted that by constructing the spring drums as described and associating them as shown with the elongated bearing sleeves 200, they are provided with relatively long bearings, so that their easy running and long continued operativeness is assured.

In order that the tension on the cable or air pipe shall be released or removed under certain conditions, as when any of these elements is withdrawn to its maximum allowable extent, I provide an automatic latch or holding device for each of the tension drums 133, which may have the detail construction shown in Fig. 2$^b$ for example. This device consists of a weighted lever 136 pivoted on one side of each drum and having an arm so formed as to be capable of entering a recess 137 in the extended portion of the sleeve 200 adjacent said drum.

Another arm of said lever extends through an opening 137$^a$ in the side of the drum so as to be normally engaged and held in a definite position by the flexible band or cord 132, which is wound in the groove of the drum, and the lever is so formed that as long as its second arm is engaged and held radially inward by the convolutions of said band, its other arm is kept out of the recess 137. When however the band 132 has been so far unwound from the drum as to free or disengage the lever 136, as will occur when the allowable length of cable or pipe has been withdrawn, the dog or pawl formed by the other arm of said lever is then free to drop under the action of gravity into the recess 137 and temporarily lock the drum from movement with its spring under tension. Under these conditions there is of course no tension exerted upon the band 132 or upon the electric cable or pipe engaged by the sheave 129 associated therewith.

When it is desired that the cable shall be taken up, an outward movement thereof followed by a sudden relaxation of the tension will first disengage the lever 136 from the recess 137, after which the spring 134 is free to automatically wind up the band 132 and draw in the cable or pipe, thus retrieving the instrument as desired;—the said lever being held out by centrifugal force so that it does not re-enter said recess.

It is noted that when the various parts of the apparatus are in the relative positions shown in Figs. 1, 2 and 3, the frame structure 120—121 with its guides or tracks projects well into the body of the casing 9 so as to prevent any of the cables becoming tangled or injured. At the same time, when desired, the above mentioned frame structure may be drawn longitudinally out of the arm 2 sufficiently to give access to the take-up sheaves and to the spring drums or any of the parts associated therewith. In order to prevent the bands overrunning the drums or getting out of the grooves thereof, I provide each drum with a retaining casing 202 and mount all these casings on a transverse member 203 fixed to the part 124.

For governing the flow of electric current to the several instruments 22—25 I provide a series of rheostatic switches 140—143, preferably of the construction described and claimed in an application for patent #448,893 filed by me July 29, 1921, and in the present case the various contacts of said switches are mounted within the casing 9 adjacent one side thereof, through which project the spindles connected to the movable contacts. These spindles on their outer ends are respectively provided with handles 140$^a$—143$^a$ whereby they may be readily manipulated, and associated with these handles or knobs are pointers 205 designed to cooperate with suitably graduated index plates 206. The switches and their operating handles are preferably arranged in a line extending around the casing to the right of the slides 27 and 28 and their electrical connections are such that the switch 140 is in circuit with the instrument 22, switch 141 with the instrument 23, switch 142 with the instrument 24, and switch 143 with the instrument 25.

A fifth rheostatic switch 144 is also similarly mounted on the side of the casing 9 and its electrical connections are such as to permit it to be used for controlling the flow of current to the heating coils of a pair of bottle heaters 145 formed by vertically positioned tubular structures carried by a bracket 146 fixed to and projecting from one side of the supporting arm 2. By means of a switch 147 (Fig. 16) mounted in the casing, and having a movable element 148 which projects downwardly from the bottom of the casing 9, this rheostatic switch 144 may be utilized to control the flow of current to a radioscope 149 (Fig. 22) removably mounted on that side of the casing 9 opposite the rheostatic switches.

Said radioscope consists of a bracket or fixture 150 having a substantially plane end face from which project upwardly extending hooks 151 designed to enter openings in the casing side and hold to the same when a spring actuated retaining hook 152, which projects from the bottom of said bracket, has been entered into a second hole in the casing where it likewise is designed to engage and hold to the side thereof. This bracket or fixture has or includes an upwardly extending portion 153 hinged to it so as to be capable of swinging in a vertical plane and on this is mounted the casing proper of the radioscope wherein is mounted an electric lamp 154.

Said casing has preferably the form of a horizontally elongated cylindrical structure closed at one end by a reflector 155 and at the opposite end having hinged to it a lens-carrying tube 156. The lamp 154 is removably mounted in a socket or receptacle 157 carried within the bracket 153 and supplied with current through a cable 158 passing through the joint between the bracket elements 150 and 153. Said cable ends in a pair of spring terminals 159 and 160 carried in a block of insulating material 161 having a plane face designed to engage the correspondingly formed plane faces of a pair of insulating blocks 162 mounted in the side of the casing 9 and respectively supporting a pair of fixed contacts 163 so positioned as to be yieldingly engaged by the contacts 159 and 160 when the hooks 151 and 152 of the radioscope have been properly entered in the appropriate openings in the side of the casing 9. These contacts 163 are connected through conductors 164 with the fifth rheostatic switch 144 and with the supply circuit.

Mounted on the top face of the supporting arm 2 is an electrically heated cup 165 designed to receive a glass or other container to be heated and including an electrical heating element in circuit with a rheostatic switch (not shown) controlled by rotating said cup on its supporting structure.

For supplying air under pressure to the two instruments 25 and 26 I provide the air conductor 8 which runs from a motor driven compressor controlled by either of the electric switches governed by said instruments 25 and 26, and extend this pipe through the hollow arms 1 and 2 into the casing 9 where it enters a manifold 166. Connected to this manifold are the casings 167 and 168 of two needle valves mounted in the side of the casing 9 and having controlling spindles terminating in handles 169 and 170 projecting from the outer cylindrical surface of the latter preferably between the rheostatic switches 143 and 144. Connected to and supplied with air through these two valves are the conductors 117 and 118 which respectively lead to the instruments 25 and 26, so that by manipulating the handles 169 and 170, the flow of air to these instruments may be accurately regulated. As shown in Fig. 20 each of said valve handles is equipped with a pointer 171 designed to cooperate with a circular index plate 172 coaxial with said handle so as to show the amount or degree of opening of its valve.

The casing 9 serves also to support a gas burner 173 which is carried on a bracket projecting from the side of the casing 9 and which is supplied with suitable gaseous fuel through a conduit 174. The burner preferably carries a stand 175, for conveniently heating instruments or containers as may be desired.

In Fig. 30 I have illustrated the manner in which the conductors are preferably disposed within the unit as well as their relation to the several instruments employed. In order to avoid the necessity for cables of different lengths for supplying the current to the instruments 22, 23 and 24 I preferably employ cables all of the same length and extend them to a terminal plate 176 (Fig. 15ª) of insulating material, running said cables through suitably formed guideways so as to take up the varying amounts of excess length and hold as well as permanently separate them.

From the above description it will be appreciated that I have provided in a single unit a number of pieces of apparatus required by a dental operator, which while all so arranged and disposed within said unit as to be readily accessible, safe from injury, protected from ordinary contamination by dust, dirt, etc., and ordinarily out of the way when not in use, are maintained operatively associated with their respective sources of energy and controlling apparatus. The above described implements, instruments and apparatus have been assembled in a relatively compact manner so as to be normally out of sight and protected, the unit as a whole being small in size and the various articles being disposed within and about it as to be always within easy reach as well as readily adjustable to suit the various positions of the patient and operator.

Obviously the instruments carried by the various slides may be replaced by others of different character and the various electrical conductors are so disposed as to reduce to a minimum any danger of short circuiting. The several controlling switches are disposed in such manner as to be most conveniently operated and they are so placed that their various parts are conveniently accessible for inspection, in addition to being highly convenient and efficient under conditions of use. The above described apparatus is particularly adapted for convenience of manufacture and assembly, in addition to which the various elements are so constructed and assembled as to permit of their inspection, repair and replacement with the utmost convenience.

I claim:

1. The combination in a dental unit of a bracket table including a casing; dental instruments removably mounted in said casing; conductors connecting said instruments with sources of energy; and controlling devices for the instruments carried by the casing.

2. The combination in a dental unit of a casing having a side opening; a guide dray in said casing; a slide operative on the guideway and formed to be moved to an extended position through said opening; instruments removably mounted on said slide; conductors connecting said instruments with sources of energy; and controlling devices for the instruments carried by the casing.

3. The combination in a dental unit of a casing having a side opening; a guide dray in said casing; a slide operative on the guideway and formed to be moved to an extended position through said opening; instruments removably mounted on said slide; conductors connecting said instruments with sources of energy; and controlling devices for the instruments carried by the casing; with instrument holders on the slide having means actuating said controlling devices.

4. The combination in a dental unit of a casing; a slide operative therein; an instrument removably mounted on the slide; and a conductor connecting said instrument with an energy source.

5. The combination in a dental unit of a casing; a slide operative therein; an instrument removably mounted on the slide; a conductor connecting said instrument with an energy source; with means for normally maintaining said conductor under tension.

6. The combination in a dental unit of a casing; a slide carried thereby; an instrument removably mounted on the slide; a conductor connecting said instrument with an energy source; and means for yieldingly retrieving said conductor when the instrument is returned to the slide after removal therefrom.

7. The combination in a dental unit of a casing; a slide therefor; an instrument holder for the slide; an instrument removably mounted in the holder; and a conductor connecting the instrument with a source of energy.

8. The combination in a dental unit of a casing; a slide therefor; an instrument holder for the slide; an instrument removably mounted in the holder; a conductor connecting the instrument with a source of energy; with an electric switch in circuit with said conductor and positioned to be operated by the holder.

9. The combination in a dental unit of a casing; a slide therefor; an instrument holder for the slide; an instrument removably mounted in the holder; a conductor connecting the instrument with a source of energy; and an electric switch in circuit with said conductor, positioned to be operated by the holder when the slide occupies a predetermined position.

10. The combination in a dental unit of a casing; a slide therefor; an instrument holder for the slide; an instrument removably mounted in the holder; a conductor connecting the instrument with a source of energy; and an electric switch in circuit with the conductor mounted to be operatively connected to the holder when the slide is in its outer position.

11. The combination of a casing; a slide therefor; an instrument carried by the slide; an electric switch for controlling current flow to the instrument; with operating means for the switch carried partly by the slide and positioned to permit actuation of the switch only when the slide is moved to a predetermined position.

12. The combination in a dental unit of a casing; a slide therefor; an instrument holder movably mounted on the slide; and an electric switch controlled by said holder.

13. The combination in a dental unit of a casing; a slide therefor; an instrument holder movably mounted on the slide; an electric switch controlling the flow of current to the instrument; and means for operatively connecting the switch with the holder to permit actuation of the former only when the slide is in a predetermined position.

14. The combination in a dental unit of a casing; a slide therefor; an electric instrument; a switch controlling the flow of current to said instrument; and a device on the slide for operating the switch.

15. The combination in a dental unit of a casing; a slide therefor; an electric instrument removably mounted on the slide; a switch controlling the current flow to said instrument; a device on the slide for operating the switch; and means for operatively coupling said device and the switch when the slide is drawn out of the casing.

16. The combination in a dental unit of a casing; a slide therefor; a plurality of electrical instruments respectively carried by the slide; conductors connecting said instruments to a current source; and means for yieldingly supporting said conductors to permit of the instruments being withdrawn for use.

17. The combination in a dental unit of a casing; a slide therefor; a plurality of electrical instruments respectively carried by the slide; conductors connecting said instruments to a current source; and means for yieldingly supporting said conductors to permit of the instruments being withdrawn for use, including independent devices for retrieving the conductors when the instruments are returned to their normal positions on the slide.

18. The combination in a dental unit of a casing; a slide therefor; a plurality of electrical instruments carried by the slide; switches for controlling the current flow to said instruments respectively; and independent devices carried by the slide for actuating the switches.

19. The combination in a dental unit of a casing; a slide therefor; a plurality of electrical instruments carried by the slide; switches for controlling the current flow to said instruments respectively; independent devices carried by the slide for actuating the switches; with means for operatively coupling the actuating devices and said switches when the slide is drawn out of the casing.

20. The combination in a dental unit of a casing; a slide movably guided therein; means including a removable key for temporarily locking said slide in a position outside of the casing; an instrument mounted on the slide; and an extensible conductor for connecting said instrument to a source of energy.

21. The combination in a dental unit of a casing; a slide movably guided therein; means for temporarily locking said slide in a position outside of the casing; an instrument mounted on the slide; an extensible conductor for connecting said instrument to a source of energy; an oscillatory holder for said instrument mounted on the slide; an electric switch; and means for operatively coupling said holder with the switch when the slide is in its outer position.

22. The combination in a dental unit of a casing; a longitudinally movable slide therein; a series of instrument holders mounted on said slide; instruments removably mounted in said holders; extensible conductors for said instruments; electric switches in the casing for controlling current flow to the instruments; and mechanism controlled by the holders for actuating said switches.

23. The combination in a dental unit of a casing; a longitudinally movable slide therein; a series of instrument holders mounted on said slide; instruments removably mounted in said holders; extensible conductors for said instruments; electric switches in the casing for controlling current flow to the instruments; and mechanism controlled by the holders for actuating said switches, the same including coupling elements positioned to operatively co-act when the slide occupies a definite position.

24. The combination in a dental unit of a casing; a slide longitudinally movable therein; a series of oscillatory instrument holders mounted on said slide; instruments removably mounted in said holders respectively; extensible conductors connecting said instruments with energy sources; a series of electric switches; and means for operatively connecting said switches with said holders when the slide with the instruments is drawn out of the casing said means including a plurality of coupling devices each including a pair of separable elements respectively connected to one of the instrument holders and one of the switches.

25. The combination in a dental unit of a casing; a slide therefor; a series of coaxial shafts mounted on the slide; instrument holders respectively connected to said shafts; instruments removably mounted in said holders; electric switches mounted in the casing; conductors connecting said instruments through the switches with current sources; a second series of coaxial shafts respectively connected to the movable elements of the switches; and means for respectively connecting the shafts of the two series when the slide occupies a predetermined position.

26. The combination in a dental unit of a casing; a supporting structure mounted therein; a guide and an electric switch both mounted on said structure; a slide operative on said guide; an instrument removably carried by the slide; a conductor connecting said instrument through said switch with a current source; and means for mechanically actuating said switch through said instrument.

27. The combination in a dental unit of a casing; a supporting structure mounted therein; a guide and an electric switch both mounted on said structure; a slide operative on said guide; an instrument removably carried by the slide; a conductor connecting said instrument through said switch with a current source; and means for mechanically actuating said switch through said instrument, with means for adjusting the position of the supporting structure within the casing.

28. The combination in a dental unit of a casing; a supporting structure removably mounted therein; a guide and an electric switch mounted on said structure; a slide operative on said guide; an instrument removably carried by the slide; a conductor connecting the instrument through said switch with a current source; and means for mechanically actuating said switch through said instrument consisting of a holder for the instrument mounted on the slide and operatively connected to the switch when said slide is drawn out of the casing.

29. The combination in a dental unit of a casing; a supporting structure removably mounted therein; a guide and an electric switch mounted on said structure; a slide operative on said guide; an instrument removably carried by the slide; a conductor connected through said switch with a current source; means for mechanically actuating said switch through said instrument consisting of a holder for the instrument mounted on the slide and operatively connected to the switch when said slide is drawn out of the casing; with means for adjusting the position of the supporting structure within the casing.

30. The combination in a dental unit of a casing; a slide operative therein; an instrument holder pivotally mounted on the slide; an electric switch mounted in the casing; substantially U-shaped coupling members respectively connected to the instrument holder and to the movable element of the electric switch and formed to transmit movement from the holder to the switch when the slide occupies a predetermined position; an instrument carried by the holder; and a conductor connecting said instrument with the switch.

31. The combination in a dental unit of a casing; a slide operative therein; an instrument holder pivotally mounted on the slide; an electric switch mounted in the casing; substantially U-shaped coupling members respectively connected to the instrument holder and to the movable element of the electric switch and formed to transmit movement from the holder to the switch when the slide occupies a predetermined position; an instrument carried by the holder; a conductor connecting said instrument with the switch; with retracting means permitting withdrawal of said instrument and conductor from the holder.

32. The combination in a dental unit of a casing; an instrument removably mounted therein; a conductor for connecting said instrument to an energy source; a device tending to constantly return said instrument to the casing after it has been withdrawn therefrom; with ratchet mechanism for rendering said device temporarily inoperative at will.

33. The combination in a dental unit of a casing; a slide therefor; a holder mounted on the slide; an instrument in the holder; a conductor connecting said instrument to an energy source; means normally resisting withdrawal of the instrument and the conductor from the holder; and means for rendering said first means temporarily inoperative when the conductor has been drawn out to a predetermined extent.

34. The combination in a dental unit of a casing; an instrument removably mounted therein; a conductor for connecting said instrument to an energy source; a sheave operative on the conductor; a tension drum mounted in the plane of movement of the sheave; and a flexible member on the drum operatively connected to the sheave to maintain the conductor under tension.

35. The combination in a dental instrument of a casing; a hollow supporting arm therefor; at least one instrument removably mounted in the casing; a conductor for connecting said instrument with an energy source; and a retrieving device for said conductor mounted in said arm.

36. The combination in a dental instrument of a casing; a hollow supporting arm therefor; at least one instrument removably mounted in the casing; a conductor for connecting said instrument with an energy source; a retrieving device for said conductor mounted in said arm; with a slide normally supporting the instrument and movably guided in the casing in a line substantially parallel to that of the arm.

37. The combination in a dental unit of a casing; a hollow supporting arm therefor; a slide longitudinally movable into and out of the casing; a series of instruments mounted on said slide; conductors for connecting said instruments to energy sources; and mechanism in the arm normally maintaining said conductors under tension.

38. The combination in a dental unit of a casing; a hollow supporting arm therefor; a slide longitudinally movable into and out of the casing; a series of instruments mounted on said slide; conductors for connecting said instruments to energy sources; and mechanism in the arm normally maintaining said conductors under tension, the same including sheaves movably guided in the arm and means for exerting tension on the sheaves respectively.

39. The combination in a dental unit of a casing; a hollow supporting arm therefor; a guide in said arm; an instrument removably mounted in the casing; a conductor connected to said instrument and extended into the guide of the arm; a sheave in the guide engaging the conductor; and spring means operative on the sheave to tend to draw the conductor into the arm.

40. The combination in a dental unit of a casing; a hollow arm supporting the same; a plurality of guideways extending longitudinally of the arm; sheaves respectively operative in the guideways; spring tension devices also mounted in the arm and respectively operative on the sheaves; a plurality of instruments removably mounted in the casing; and conductors for supplying said instruments with energy operatively engaged by the sheaves.

41. The combination in a dental unit of a casing; a hollow arm supporting the same; a plurality of guideways extending longitudinally of the arm; sheaves respectively operative in the guideways; spring tension devices also mounted in the arm and respectively operative on the sheaves; a plurality of instruments removably mounted in the casing; conductors for supplying said instruments with energy operatively engaged by the sheaves; with means for rendering any one of said tensioning devices inoperative at will.

42. The combination in a dental unit of a casing; a hollow supporting arm therefor; a guideway in the arm; an instrument removably mounted in the casing; a conductor for connecting said instrument with an energy source and extending into the guideway; with tension means for said conductor including a sheave operative in the guideway.

43. The combination in a dental unit of a casing; a hollow supporting arm therefor; a structure constituting a plurality of guideways within the arm; a plurality of instruments removably mounted in the casing; conductors for the instruments extending into the guideways; and means for maintaining the conductors under tension including sheaves engaging them in the guideways respectively.

44. The combination in a dental unit of a casing; two slides movable in substantially parallel lines therein; instruments for said slides respectively; electric switches in the casing adjacent opposite sides of said slides; conductors respectively connecting said switches with the instruments; and mechanism for detachably connecting each instrument with its particular switch when the slide on which it is mounted is moved to a predetermined position.

45. The combination in a dental unit of a casing; a slide guided therein; an instrument holder on said slide; an instrument removably mounted in said holder; a conductor connecting said instrument with an energy source; means for exerting tension on said conductor; and means for locking the slide in a position outside of the casing permitting withdrawal of the instrument.

46. The combination in a dental unit of a casing having a side opening; a substantially flat plate constituting a slide movably guided in the casing and capable of being withdrawn through said opening thereof; means for locking said slide both in its outer and its inner position; an instrument holder mounted on the slide; an instrument in the holder; and means normally tending to draw the instrument into the holder.

47. The combination in a dental unit of a casing; a slide movably guided therein and capable of being withdrawn through an opening in the side thereof; a tubular holder mounted on said slide; an instrument removably mounted in the holder; a conductor operative through the holder for connecting the instrument with a source of energy; means for movably supporting the instrument holder on the slide; and an electric switch positioned to be actuated by movement of the holder when the slide occupies a predetermined position.

48. The combination in a dental unit of a casing; an instrument supporting device in said casing; an instrument removably mounted in said device; an electric switch in the casing connected in circuit with the instrument; and mechanism permitting operation of the electric switch only when the instrument supporting device occupies a predetermined position.

49. The combination in a dental unit of a casing; an instrument holder movably mounted therein; an instrument normally mounted in the holder; an electric switch in the casing; and means for operating said switch by movement of the holder when the latter occupies a predetermined position.

50. The combination in a dental unit of a casing; an instrument holder movably mounted therein; an instrument normally mounted in the holder; an electric switch in the casing; and means for operating said switch by movement of the holder only when the latter occupies a predetermined position outside of the casing.

51. The combination in a dental unit of a casing; a slide longitudinally movable in the casing and capable of being withdrawn therefrom at will; an instrument holder on the slide; an instrument removably mounted in the holder; an electric switch in the casing; means for operatively coupling said switch to the holder when the slide occupies a predetermined position; and a current modifying device in circuit with the switch including an operating handle projecting from the side of the casing.

52. The combination in a dental unit of a casing; and a sub-unit therein consisting of a supporting structure, an instrument slide on said structure, an instrument mounted on the slide, and an electric switch also mounted on the supporting structure controlling flow of current to the instrument.

53. The combination in a dental unit of a casing; and a sub-unit therein consisting of a supporting structure, a plurality of instrument slides thereon, instruments respectively mounted on said slides, and electric switches for controlling current flow to the instruments also mounted on the supporting structure.

54. The combination in a dental unit of a casing; and a sub-unit therein consisting of a supporting structure, means for adjusting said supporting structure relatively to said casing, an instrument slide on the structure, an instrument mounted on the slide, and an electric switch controlling flow of current to the instrument also mounted on the supporting structure.

55. The combination in a dental unit of a casing; a hollow supporting arm therefor; and a sub-unit in the casing consisting of a supporting structure, an instrument slide mounted on the structure, an instrument mounted on the slide, a cable connected to the instrument and extending into the arm so as to be extensible therefrom at will, an electric switch controlling the flow of current to the instrument also mounted on the supporting structure, and means for adjusting the position of the supporting structure relatively to the arm.

56. The combination of a supporting arm mounted to swing in a substantially vertical axis; a casing carried by said arm; instruments carried by the casing; conductors connecting said instruments to sources of energy; and means mounted in said arm for retrieving said conductors.

57. The combination of a hollow arm; a swing carried thereby; instruments in said casing; guideways removably mounted in the arm; conductors connecting said instruments with energy sources and extending into the guideways; and retrieving means for said conductors including members operative in the guideways to maintain tension on the conductors.

58. The combination of a casing; an electrical instrument extensibly mounted in said casing; a slide slidably guided in and capable of being moved to project from the casing; a holder for the instrument mounted on the slide; means normally tending to draw the slide into the casing; and a latch for holding the slide in its projected position.

59. The combination of a casing; an instrument holder in the casing mounted to be extended at will; an instrument removably carried by the holder; an electric switch in the casing in circuit with said instrument and operative by said holder; with a rheostatic switch for said instrument also carried by the casing.

60. The combination of a casing; a slidable supporting structure therein; at least one instrument removably mounted on said slidable structure; a conductor connected to the instrument; retrieving means for said conductor and a controlling device in the casing connected to said conductor, having an operating handle projecting from said casing.

PERCY RUSSELL.